(12) United States Patent
Myers et al.

(10) Patent No.: US 6,868,140 B2
(45) Date of Patent: *Mar. 15, 2005

(54) TELEPHONY CALL CONTROL USING A DATA NETWORK AND A GRAPHICAL USER INTERFACE AND EXCHANGING DATAGRAMS BETWEEN PARTIES TO A TELEPHONE CALL

(75) Inventors: John C. Myers, Toronto (CA); Brian Cruickshank, Oakville (CA)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/220,860

(22) Filed: Dec. 28, 1998

(65) Prior Publication Data

US 2002/0181670 A1 Dec. 5, 2002

(51) Int. Cl.[7] .................................................. H04M 1/64
(52) U.S. Cl. .................... 379/67.1; 379/76; 379/88.08; 379/88.13; 379/88.17; 379/88.18; 379/88.19; 379/900; 379/902; 379/908
(58) Field of Search ........................... 379/67.1, 72, 76, 379/88.08, 88.11, 88.13, 88.14, 88.17, 88.19, 88.2, 88.22, 88.25, 900, 902, 908

(56) References Cited

U.S. PATENT DOCUMENTS

| | | | | |
|---|---|---|---|---|
| 5,652,789 A | * | 7/1997 | Miner et al. ................. 379/201 |
| 5,742,670 A | * | 4/1998 | Bennett ....................... 379/142 |
| 5,884,032 A | * | 3/1999 | Bateman et al. ........ 395/200.34 |
| 5,884,262 A | * | 3/1999 | Wise et al. .................. 704/270 |
| 5,946,386 A | * | 8/1999 | Rogers et al. .......... 379/265.09 |
| 5,978,806 A | * | 11/1999 | Lund ............................ 707/10 |
| 5,999,965 A | * | 12/1999 | Kelly .......................... 709/202 |
| 6,016,336 A | * | 1/2000 | Hanson ................... 379/88.23 |
| 6,031,836 A | * | 2/2000 | Haserodt ..................... 370/389 |
| 6,046,762 A | * | 4/2000 | Sonesh et al. ................ 348/16 |
| 6,058,415 A | * | 5/2000 | Polcyn ........................ 709/200 |
| 6,069,890 A | * | 5/2000 | White et al. ................. 370/352 |
| 6,226,362 B1 | * | 5/2001 | Gerszberg et al. ....... 379/88.13 |
| 6,226,678 B1 | * | 5/2001 | Mattaway et al. .......... 709/230 |
| 6,233,318 B1 | * | 5/2001 | Picard et al. ............ 379/88.17 |
| 6,310,941 B1 | * | 10/2001 | Crutcher et al. ......... 379/88.17 |
| 6,377,944 B1 | * | 4/2002 | Busey et al. .................... 707/3 |

OTHER PUBLICATIONS

Newton's Telecom Dictionary, AIN p. 46.*

* cited by examiner

*Primary Examiner*—Allan Hoosain

(57) ABSTRACT

In a communications network, a method and apparatus are disclosed for using a graphical user interface for telephony call control. A method is also disclosed for sending a datagram from a called party to a calling party. Call control of a call is diverted to a voice-mail system. The IP address of the caller is determined. The IP address of the caller is determined by either a search on a look-up table or from a voice over Internet call set up message. Call control information, or a datagram is sent to the caller. In the case of call control information, the caller inputs call control commands which are received by the voice mail system. The invention provides an easier method and apparatus to navigate voice-mail menus and reduces the problem of "voice-mail jail".

22 Claims, 20 Drawing Sheets

TELEPHONY CALL CONTROL USING A DATA NETWORK AND A GRAPHICAL USER INTERFACE AND EXCHANGING DATAGRAMS BETWEEN PARTIES TO A TELEPHONE CALL

FIELD OF THE INVENTION

This invention relates to a data-network-based graphical user interface (GUI) for facilitating telephony call control, and/or for exchanging datagrams between parties to a telephone call. In one aspect the invention relates to using a graphical user interface to control operation of a called voice-mail system.

BACKGROUND OF THE INVENTION

Voice-mail systems and automated switchboards are becoming more common. In these types of systems a caller interacts with a synthesized or recorded voice and selects one of a series of options in order to try to reach the telephone handset of, or leave a message with, an intended called party. Such systems are growing in complexity and sophistication. For example, many automated switchboard systems have automated directory functions, which allow a caller to locate a called party or the called party's telephone extension by pressing numbers on a telephone keypad that correspond to the letters of a called party's name. As well, many automated switchboard systems perform call screening tasks by asking the caller to select one of a range of types of services. For example, the caller could be asked to press 1 for account information, to press 2 for product information, to press 3 for delivery information, to press 4 for locations, to press 5 for a customer service representative, and press 0 to reach a switchboard operator. Often after selecting one of these options, a caller may be asked to select one from another set of options, to input information from their telephone keypad, and so on. In many automated systems these types of extensive menus and menu-trees may be presented to callers.

When calling a voice mail system a caller is often presented with a number of options such as hearing the called party's outgoing message, skipping the called party's outgoing message, speaking to the called party's assistant or secretary, or speaking to a switchboard attendant. Again, these options are usually presented to the caller by a voice-synthesized menu of choices from which the caller selects one by way of pressing a key on their telephone handset.

Navigating through the menu of choices presented by these voice mail and automated switchboard programs can be time-consuming, confusing and annoying. These problems are sometimes referred to colloquially as "voice-mail jail". Improved methods are required for telephony call control by a caller, particularly when a caller calls a voice-mail system or an automated switchboard which has complex or extensive menus which the caller is expected to navigate.

More and more people are using packetized data networks to exchange data, including graphical information. The most popular and widespread example of this is the internet.

People making telephone calls would often find it useful to be able to exchange data at the same time as they make their telephone call. Improved methods and devices are required to simultaneously exchange data between parties to a telephone call.

SUMMARY OF THE INVENTION

In accordance with one embodiment of the invention there is provided a system or method for a caller to use a graphical user interface to control the voice mail system or automated switchboard of a called party. The invention solves the problem of time-consuming, confusing or annoying navigation through voice-mail menus or menu-trees by allowing some of that navigation to occur through the caller's graphical user interface.

In accordance with the present invention, there is provided a method of handling a voice call diverted to a voice mail system (VMS), comprising: determining a data network address of a network terminal associated with calling telephone station apparatus for said voice call; and sending a voice call facilitation message to said address over a data network.

According to another aspect of the present invention, there is provided a voice mail system (VMS), comprising: a voice call network connection; a data network connection; a look-up table matching caller line identifications (CLIDs) with data network addresses for associated data network equipment; and means for, on receiving a voice call, looking up a data network address and sending a message to said address identifying said call.

According to a further aspect of the invention, there is provided a computer readable medium storing computer executable instructions comprising: means for determining a data network address of a network terminal associated with calling telephone station apparatus for a voice call; and means for sending a voice call facilitation message to said address over a data network.

According to a yet further aspect, there is provided a method of handling a voice call, comprising: determining a data network address of a network terminal associated with calling telephone station apparatus for said voice call; identifying a graphical page associated with called telephone station apparatus for said voice call; and sending said graphical page to said address.

According to a further aspect of the invention, there is provided a method comprising:
  (a) transmitting a call from a telephone handset to a caller gatekeeper;
  (b) exchanging set up information with a called gatekeeper;
  (c) diverting said call to a voice-mail system associated with said called gatekeeper;
  (d) sending the caller IP address to a web site server associated with said called gatekeeper;
  (e) sending a call control URL to said caller IP address from said web server;
  (f) receiving a call control command from said caller at said web server; and,
  (g) transmitting a call control signal to said voice mail system in response to said call control command.

According to a yet further aspect of the invention, there is provided a method comprising:
  (a) selecting a called party with an auto-dialler;
  (b) placing a call to said called party;
  (c) obtaining the called party's URL;
  (d) requesting the called party's URL; and,
  (e) transmitting the called party's URL to the caller's IP address.

In accordance with another aspect of the invention, there is provided a method comprising:
  (a) receiving an IP address of a caller;
  (b) sending a call control URL to said IP address;
  (c) receiving a call control command from said IP address; and, (d) transmitting a call control signal to a voice mail system in response to said call control command.

According to a further aspect of the invention, there is provided an apparatus comprising:

(a) means for receiving an IP address of a caller;

(b) means for sending a call control URL to said IP address;

(c) means for receiving a call control command from said IP address; and, (d) means for transmitting a call control signal to a voice mail system in response to said call control command.

According to a yet further aspect, there is provided an apparatus comprising:

(a) a network interface;

(b) a processor connected to said network interface;

(c) a voice-mail interface connected to said processor;

(d) a memory associated with said processor;

(e) an internet software application stored in said memory, for, via said network interface receiving IP addresses transmitting call control URL's, and for receiving call control commands; and, (f) a stored in said memory voice-mail system software application for, via said voice-mail interface, transmitting signals to said voice-mail interface in response to call control commands.

According to another aspect of the invention, there is provided a method for operating a voice mail system comprising:

(a) accepting a call at said voice mail system;

(b) passing call control options to an associated data network element, said call control options having graphical components;

(c) receiving call control signals for said call from said associated data element server; and, (d) controlling said call in response to said call control signals.

According to another aspect of the invention, there is provided a method for operating a telephone station apparatus having a telephone and a connection to a data network through a computer terminal comprising:

(a) initiating a call to a called party;

(b) receiving graphical call control data;

(c) displaying graphical call control data; and, (d) issuing call control commands through said computer terminal to said data network.

An advantage of the present invention is that it provides a less time-consuming, less confusing, and less annoying way to navigate complex or extensive menus provided by a voice-mail system or by an automated switchboard.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The present invention will be more clearly understood after reference to the following detailed specification read in conjunction with the drawings wherein.

DETAILED DESCRIPTION OF THE PREFERRED EMBODIMENTS

Figure 1:
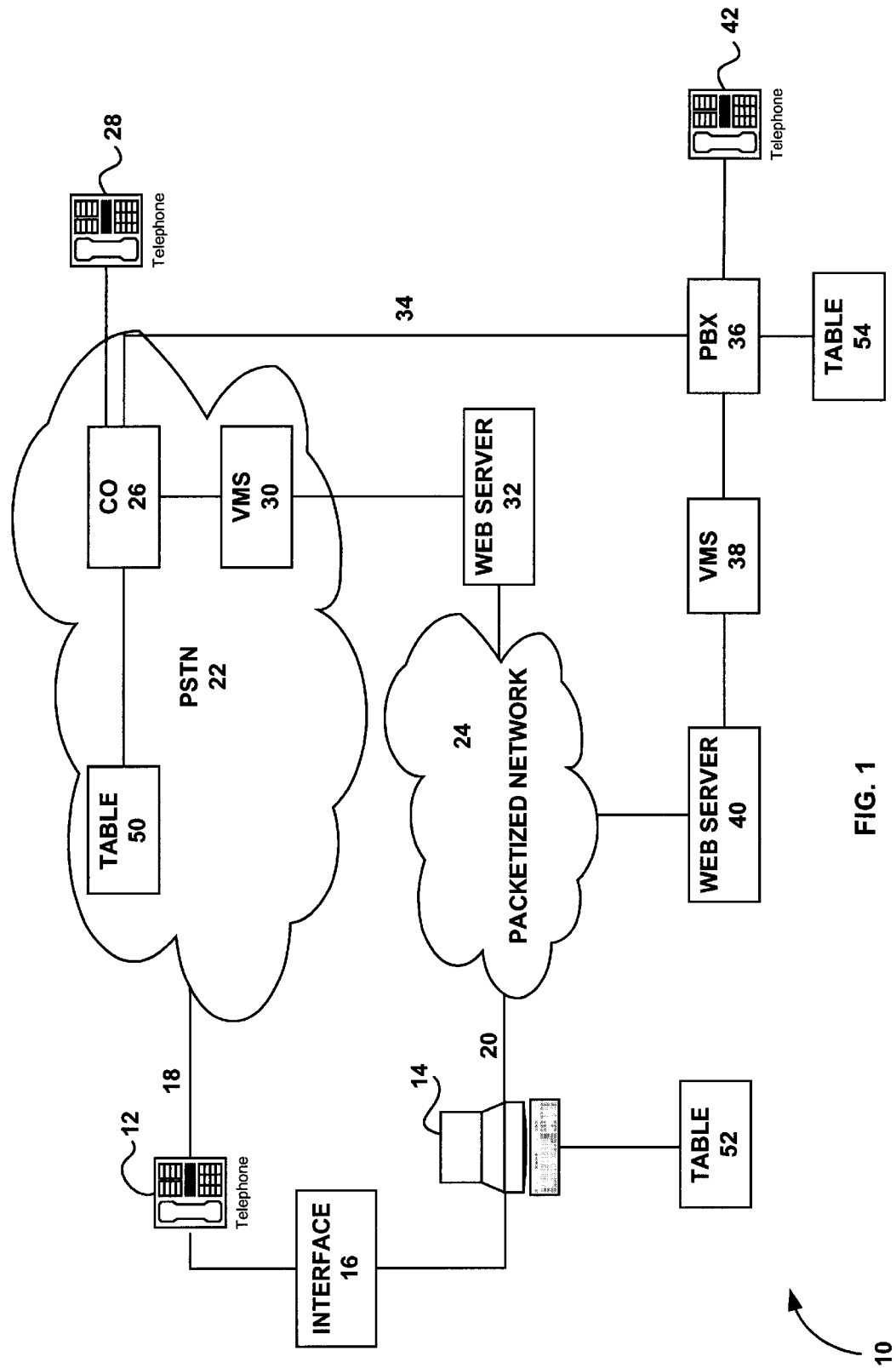
FIG. 1 is a schematic drawing of a computer network and telephone network in accordance with one embodiment of the invention.

Referring to FIG. 1, a system embodying the invention is shown generally at 10. A caller, that is a person who places a call, uses telephone handset 12. Proximate to telephone handset 12 is a computer terminal 14. Telephone handset 12 is connected to a switched network, which may be the Public Switched Telephone Network (PSTN) 22, by way of communication line 18. Computer terminal 14 is connected to a packetized data network 24, such as the internet, by way of communication line 20. Interface 16 is used to pass signals from telephone handset 12 to computer terminal 14. As will be apparent to those skilled in the art, a wireless connection may be used to connect telephone 12 or computer terminal 14 to their respective networks, or to connect telephone 12 to computer terminal 14. Computer terminal 14 and telephone 12 are collectively referred to as a telephone station apparatus.

Figure 2:
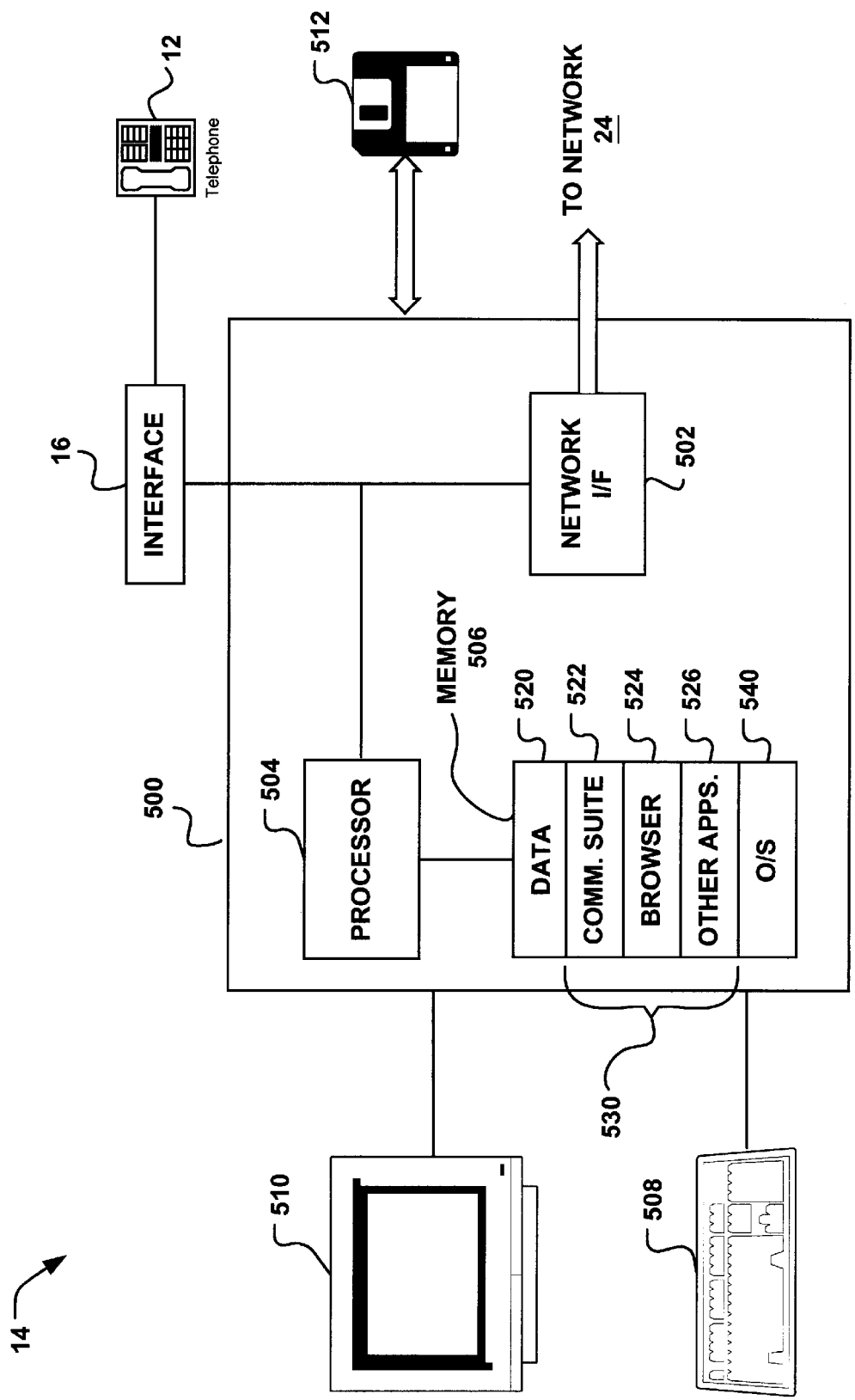
FIG. 2 is a schematic detail drawing of a portion of FIG. 1.

FIG. 2 is a schematic diagram of computing terminal 14. Computing terminal 14 consists of a personal computer (PC) 500 connected to display 510, to input device 508 and to network 24. Display 510 can be any type of display known in the art. Similarly input device 508 can be comprised of combinations of common input devices such as keyboards, mice, audio input devices, or other known input devices. PC 500 is comprised of a central processing unit (CPU) 504 interconnected to memory 506 and network interface 502. CPU 504 can be an Intel Pentium™, Motorola PowerPC™ or other suitable processor capable of performing the operations necessary to connect to PC 500 to a network such as the internet or more specifically to the WWW. Memory 506 is comprised of volatile memory, including Random Access Memory (RAM), and non-volatile memory, such as a hard disk drive or Read Only Memory (ROM) or preferably a combination of these types of memory. Network interface 502 can be a network interface card such as an Ethernet or Token Ring network card, or a modem that connects to network 24 through the PSTN and an Internet Service Provider. PC 500 is also capable of reading removable media 512, which may be a diskette, CD-ROM or other method of transferring data to memory 506 of PC 500. As is known to those skilled in the art, computing device 14 is not limited to the embodiment described above, but can be modified to come within the spirit and scope of this invention.

Memory 506 contains the software programs and data necessary to enable a computer terminal 14 to connect and communicate with data network 24, such as the WWW. Memory 506 is comprised of data 520, applications software 530 and operating system 540. Operating system 540 preferably includes a graphical user interface (GUI) such as Microsoft Windows 98™ or the Macintosh Operating System 8™. Application software 530 is comprised of: communications suite 522, which includes means for connecting to data network 24, and may include TCP/IP, PPP, SLIP, Ethernet or Token Ring software protocols; graphical image browser 524 such as Netscape Navigator™, Microsoft Internet Explorer™, Mosaic™ or other commercially available browsers (including, if desired, text based browsers such as Lynx™); and other applications 526. Processor 504 is also connected to interface 16 which is used to send and receive signals from telephone handset 12.

Referring again to FIG. 1, another part of PSTN 22 is central office 26. Associated with central office 26 is look-up table 50 which matches caller IDs with internet addresses. Alternatively, in place of table 50, a table 52 may be associated with computing device 14 which matches called numbers to web server addresses. Central office has associated with it voice-mail system (VMS) 30, telephone 28, and private branch exchange (PBX) 36. Associated with VMS 30 is web server 32. Web server 32 is connected with packetized data network 24.

Figure 3:
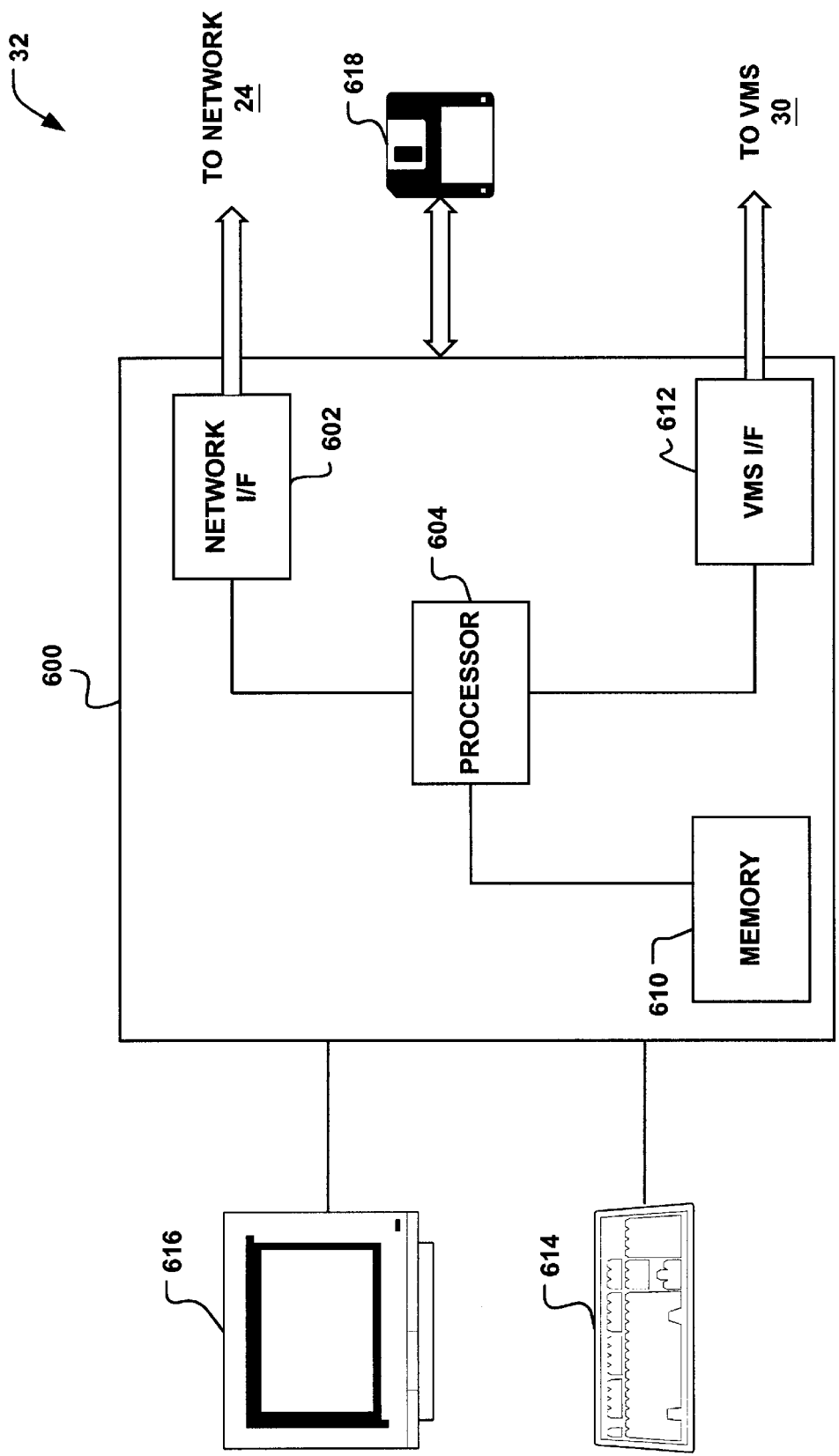
FIG. 3 is a schematic detail drawing of a portion of FIG. 1.

FIG. 3 is a schematic diagram of web server 32. Similar to computing terminal 14, web server 32 consists of a computer server 600 optionally connected to a display 616 and input device 614. Computer server 600 is a networked computer connected to network 24. Input device 614 and display 616, while optional, may consist of similar devices corresponding to input device 508 and display 510 of computing device 14.

Computer server 600, as is common in the art, is typically a Reduced Instruction Set Computing (RISC) device such as a Sun Microsystems UltraSparc™ Station, or an IBM RS/6000™ computer. However, computer server 600 may also be a PC such as Compaq Proliant™ or IBM NetFinity™ server or any other computer suitable for hosting web pages and connecting to the internet, either directly or through the PSTN. Computer server 600 is comprised of CPU 604, typically a Sun UltraSparc™ CPU, Motorola or IBM PowerPC™ CPU or Intel Pentium™, Pentium II™ or Pentium Pro™ CPU; interconnected with memory 610, network interface card 602, and Voice Mail System Interface 612. Network interface card 602 is connected to network 24, and may be an ethernet, token ring, ATM card, T1 interface or any other suitable means of communication with a data network to support access of a web page by a user. VMS Interface 612 can be a plurality or bank of modems connected to VMS 30, an ADSL card or similar analog to digital communications device. Memory 610, which is in communication with CPU 604, consists of a combination of volatile and non-volatile memory, typically RAM, ROM and hard disk drive or optical storage device, used to store data, software applications and an operating system. Computer server 600 is also capable of reading removable media 618, which typically is a CD-ROM, diskette or other removable media, sufficient to transfer software or data to computer server 600, generally, and memory 610 specifically.

Figure 4:
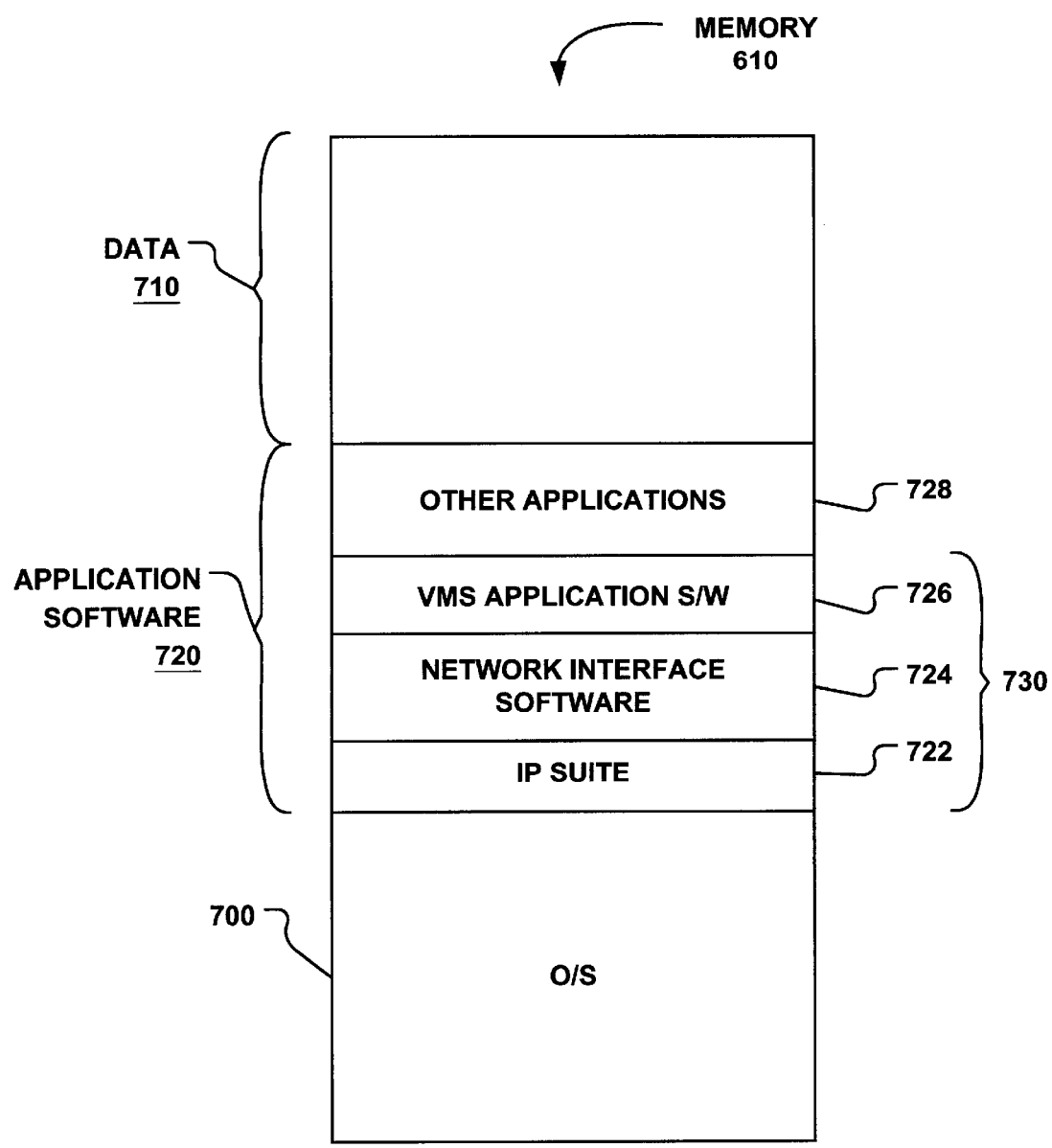
FIG. 4 is a schematic detail drawing of a portion of FIG. 3.

Referring to FIGS. 3 and 4 memory 610 of computer server 600 is logically divided into three portions, namely operating system 700, application software 720 and data 710. Operating system 700 of computer is preferably a multitasking operating system such as Unix, Linux, Microsoft Windows NT™, Sun Solaris™ or IBM AIX™. However, an operating system capable of hosting a web site, connecting to the VMS, and coordinating and performing the operations disclosed below is sufficient. Application software 720, stored in memory 610, is further subdivided into VMS application software 726, network interface software 724, IP suite 722, and other applications 728. Network interface software 724 enables the operation of network interface 602 and maintains communication between the user, via computing terminal 14, and computer server 600 over data network 24. VMS application software 726 enables the operation of VMS interface 612 and allows signals to be passed between VMS 30 and processor 604. IP Suite software provides the communication protocols, namely the Internet Protocols described in RFC 1011, which is maintained by the Network Working Group of the IETF (Internet Engineering Task Force), the contents of which are hereby incorporated by reference for all purposes, and is designed to facilitate communication between computer server 600 and computing device 14 over data network 24. Together VMS application software 726, network interface software 724 and IP Suite 722 comprise communications software 730.

IP suite 722 further includes an HTTP server or daemon; a server resolution application; and, common gateway interface ("CGI") programs.

The HTTP server may, for example, be an Apache Web Server or a Microsoft Internet Information Server application. CGI programs typically interface an HTTP server application with other data and applications at server 32. CGI programs may be compiled or interpreted programs, and may therefore include a suitable interpreter such as Perl interpreter, or the like.

Figure 5:
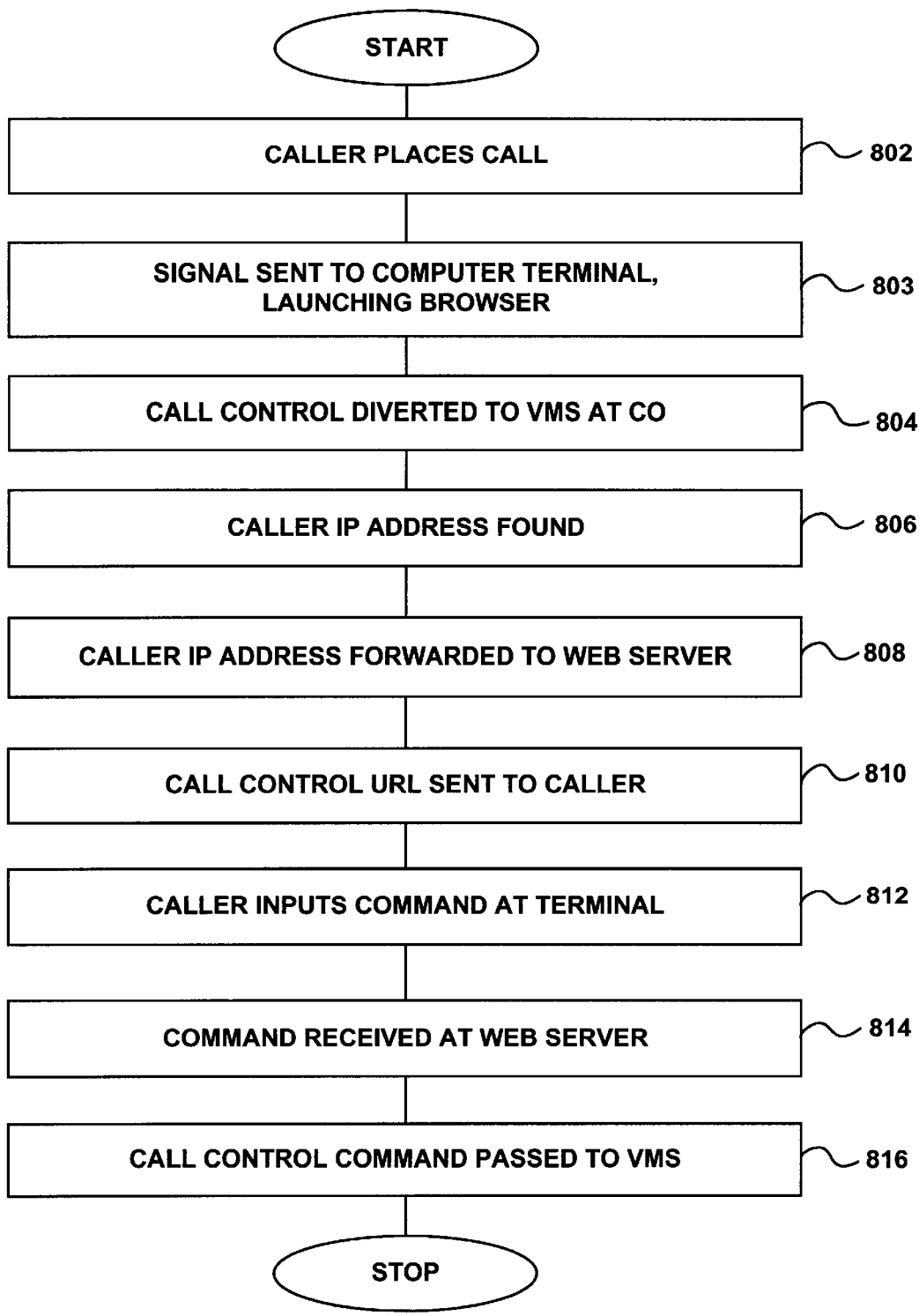
FIGS. 5 and 6 are flow charts illustrating portions of the software control of the system of FIG. 1.

VMS application software 726 is capable of interrupt handling, data conversion and passing signals between VMS 30 and Web server 32, thus allowing call control of VMS 30 from computer terminal 14 over data network 24 and through web site server 32. One method of doing this is shown in FIG. 5 and is described below in conjunction with FIG. 1:

(A) A person places call from telephone handset 12 to a caller located at telephone 28 (Step 802). Alternatively, the call could be initiated by a dialler program running on computer terminal 14.

(B) At central office 26, the call is diverted to VMS 30 (Step 804). This may occur because the called party is not available or because the call has been diverted to an automatic switchboard.

(C) When central office 26 diverts a call to the VMS 30 it also compares the caller ID to values stored in table 50, which matches the caller ID to an internet address (Step 806). If there is no match the call proceeds as a voice only call.

(D) Upon finding a caller internet address, a message is sent to the caller IP address via a CGI script running on Web Server 32. The server software that is running on the caller's terminal receives this data and performs actions based on the data. Possible actions include launching a web browser with a URL specified by the data. The URL will address world wide web pages which allow the construction of images, representing hierarchical menus, using the graphical user interface (GUI) of computer terminal 14. Thus, a browser program may be launched on computer terminal 14 with a call control URL as a parameter such that a call control web page may be displayed on terminal 14. Therefore, instead of having to listen to, and remember, a set of navigational choices presented over telephone 12, these navigational choices are presented as graphical images on computer terminal 14.

(E) The caller inputs commands by way of input device(s) 508 (FIG. 2) (Step 812). Thus, for example, the caller can make navigational choices by way of clicking a mouse-directed-pointer on a portion of the GUI. The mouse click generates caller input commands. Alternatively, the caller could input commands by typing on the keyboard.

(F) The caller input commands are received by CGI (common gateway interface) scripts running on web server 32 (Step 814). Alternatively the CGI scripts could run on computer terminal 14 or on some other device which is part of packetized network 24 and which can receive the caller input commands and then transmit them to web server 32.

(G) The CGI scripts pass data to the VMS Application Software 726 (FIG. 4) of the web server 32. Call control commands are then sent to VMS 30 by way of VMS interface 612 (FIG. 3) (Step 816).

(H) The VMS 30 controls the call based on these call commands. Further exchange of information from computer terminal 14 to web server 32 can occur in order to further control the call and to allow the caller to navigate through the menus and options of the voice-mail system. (It should be noted throughout this detailed description that whenever the phrase voice-mail system is used it is interchangeable with automated switchboard) or any other voice synthesis user response (IVR) application.

Figure 6:
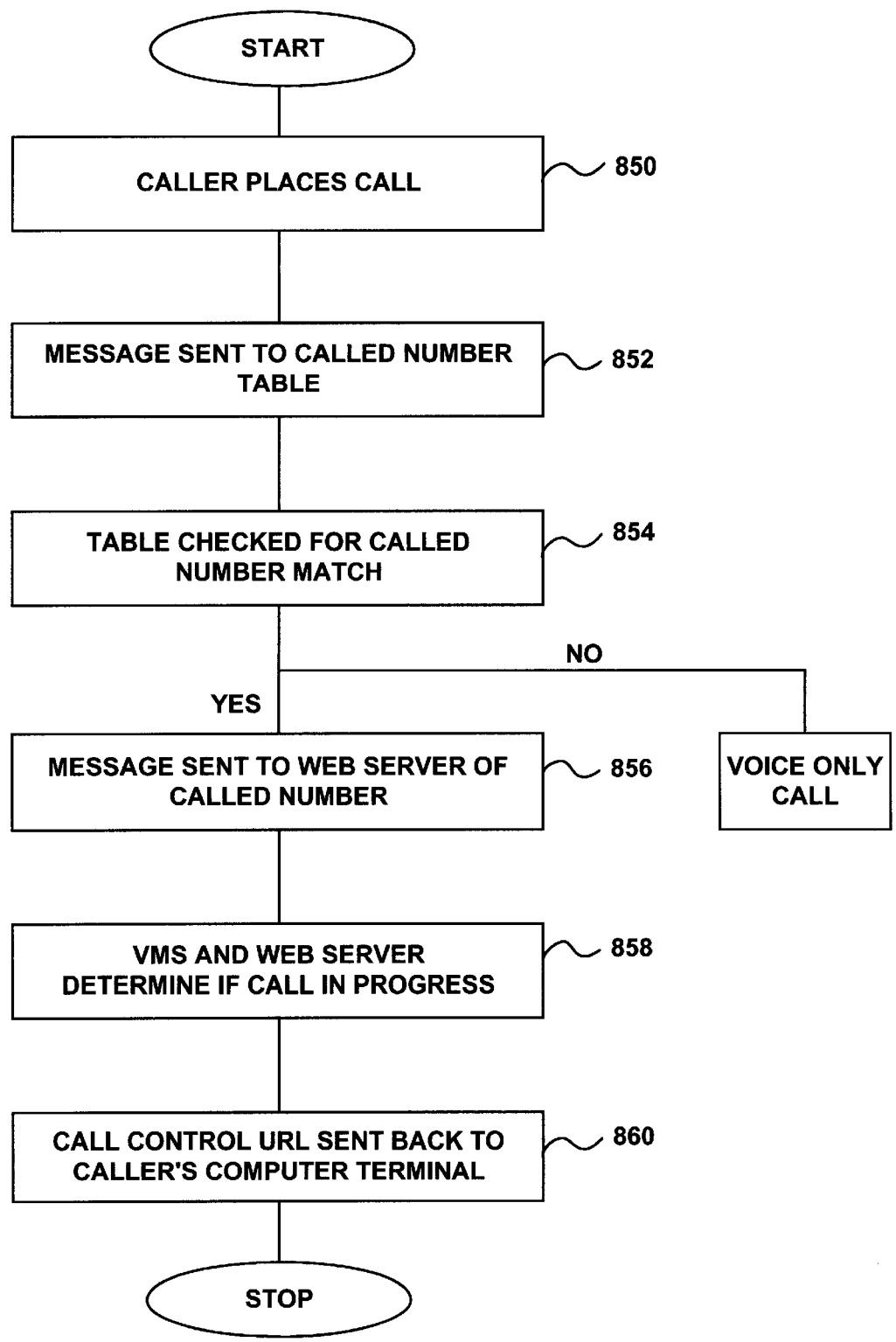

In an alternative embodiment of the present invention, a table matching caller ID to caller internet address is not required. This alternative embodiment performs in the following manner which is also set out in flow chart of FIG. 6.

(A) A caller places a call from telephone handset 12 intended for telephone handset 28 (Step 850).

(B) When the call is placed a signal is sent from telephone handset 12 to computer terminal 14 via interface 16. This message contains the called number and the caller ID (Step 852).

(C) Computer terminal 14 takes the called number (the number of telephone 28) and queries an associated table 52. Table 52 contains a matching of called numbers and the web server address of the web server associated with the voice-mail system of the called number. Table 52 is populated by entering data through a terminal device (not shown) or by extracting data from other pre-existing databases. If no match, then proceeds as a voice-only call.

(D) If a match to the called number is found in the table, a message is then sent by computer terminal 14 to the web server which is at the address corresponding to the called number, say web server 32. The message contains the caller ID, called number, and the internet address used by the caller (Step 856).

(E) This message is received by web server 32. In conjunction with VMS 30, it determines if a call between the caller ID and the called number is in progress and has been diverted to VMS 30 (Step 858). If a call is in progress, then a call control URL is sent to the caller's internet address (Step 860). The call then proceeds as in steps E-H above (Steps 812–816).

It should be noted that table 52 need not be associated with computer terminal 14, but only has to be a table which computer terminal 14 can send a query to and receive an answer from, such as by way of the ODBC or CORBA architecture.

Figure 7:
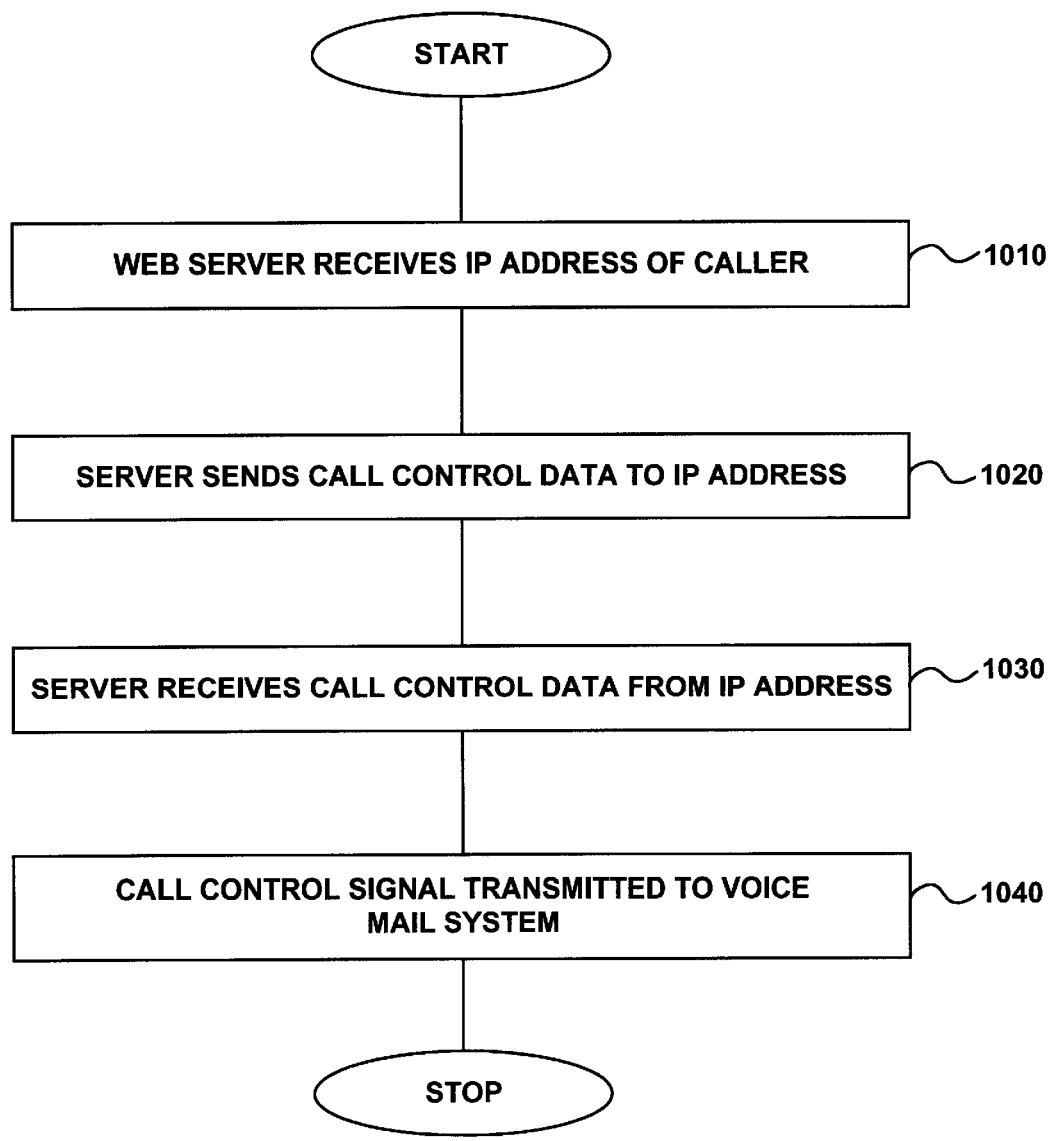
FIG. 7 is a flow chart illustrating a portion of the software control of the web site server of FIG. 3.

The foregoing provided an overview of call control methods. The following details the procedure followed by web server 32 in interacting with computer terminal 14 and VMS 30 to effect call control of a call originating from telephone 12. As set out in FIG. 7, the following steps occur:

(I) Web server 32 receives an IP address of a caller who has placed a call from telephone 12, the call having been diverted to VMS 30 (Step 1010).

(II) Web server 32 sends data to the IP address of the caller, such as a URL, which would normally comprise world wide web pages which allow the construction of images representing hierarchical menus using the graphical user interface of computer terminal 14 (Step 1020). Typically, the caller would have established an IP address on computer terminal 14.

(III) Web server 32 then receives call control data from the caller's IP Address (Step 1030). This call control data is typically input through the GUI on computer terminal 14 and processed by way of CGI scripts.

(IV) Web server 32 then transmits call control signals to VMS 30 in response to the received call control data in order to control navigation through the voice mail system (Step 1040).

Steps 1020–1040 could be repeated as the call continues, to assist the caller to navigate call control menus.

Figure 8:
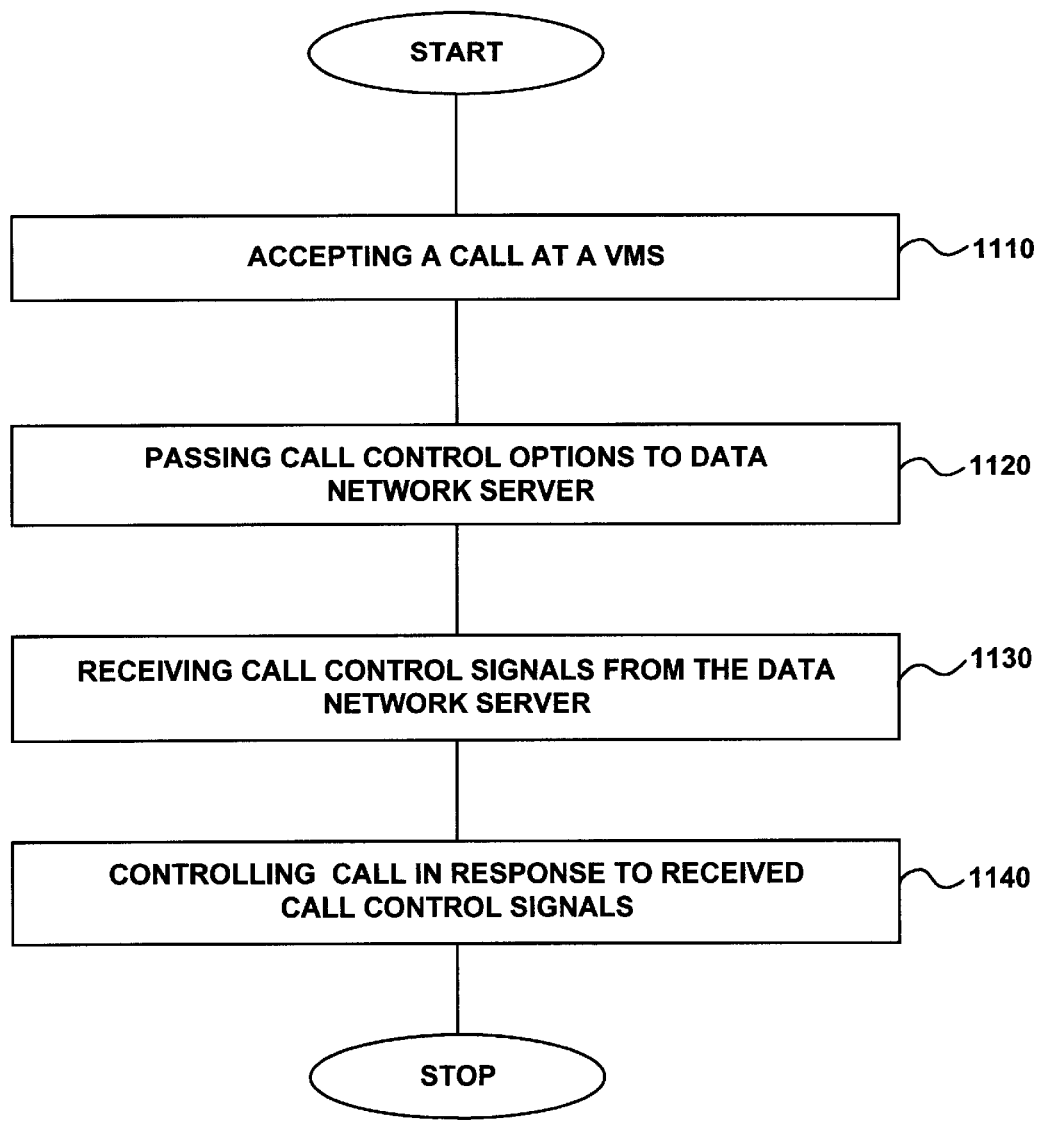
FIG. 8 is a flow chart illustrating a portion of the software control of the voice mail system of FIG. 1.

The following details the steps taken by the VMS 30 interacting with web server 32 to control a call that has originated from telephone 12 and has been diverted to VMS 30. This comprises the following steps (referring to FIGS. 1 and 8):

(I) accepting a call originating from telephone 12 (Step 1110);

(II) in response to a prompt indicating that the caller has an internet address, passing call control options to an associated data network server, such as web server 32 (Step 1120). The prompt may comprise the central office 26 sending the caller internet address to VMS 30 as with the method described in conjunction with FIG. 5 or may comprise an indication received from the web server 32 that the caller has an IP address, as with the method described in conjunction with FIG. 6. The call control options have a graphical component, for example they are in a format that can be translated into objects displayed on a GUI.

(III) receiving call control signals for said call from said data network server (Step 1130).

(IV) controlling said call at VMS 30 in response to said call control signals (Step 1140).

Steps 1120 to 1140 may be repeated to allow the caller to navigate through a series of menus or call control options as the call continues.

Figure 9:
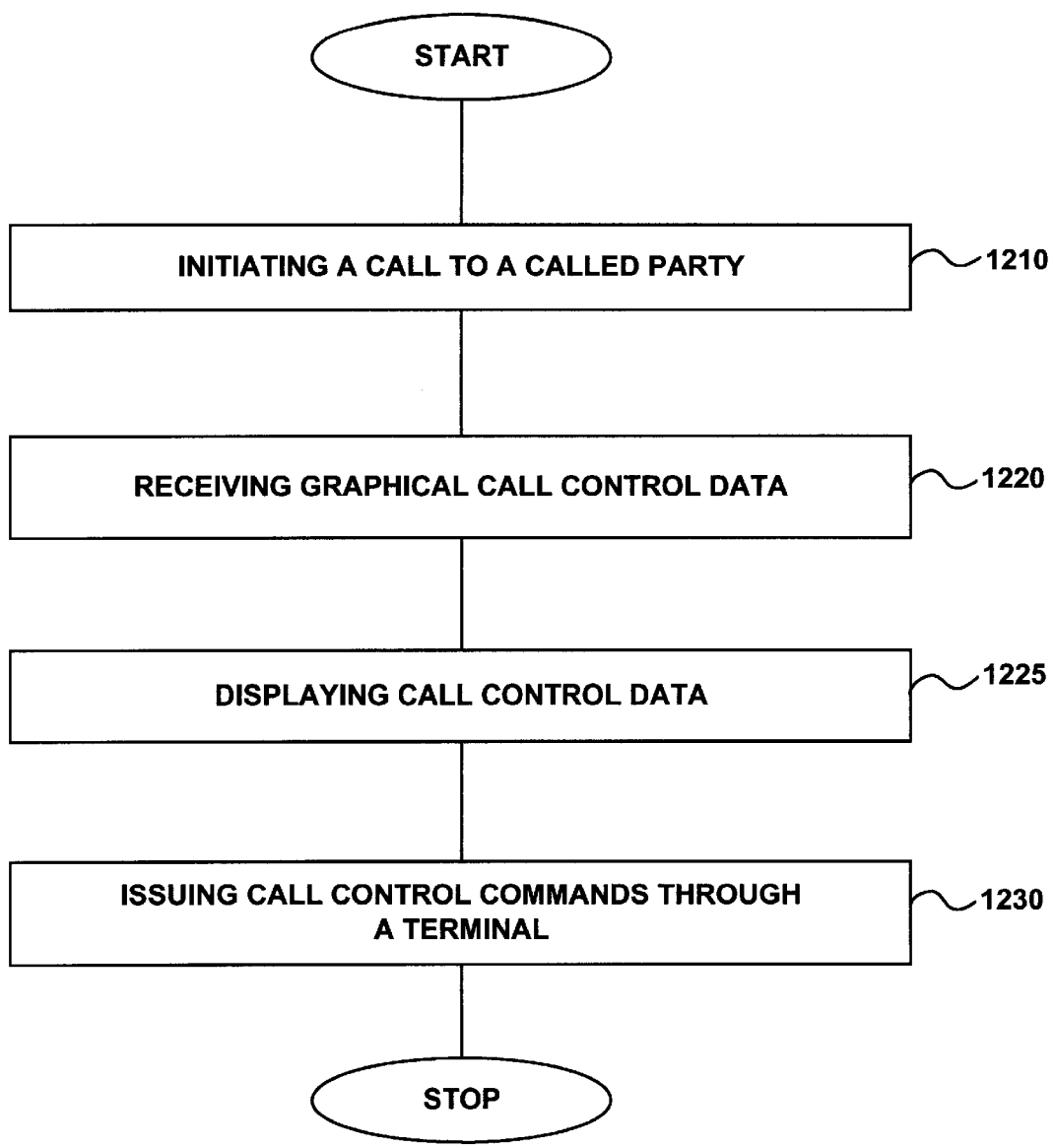
FIG. 9 is a flow chart illustrating a portion of the software control of the telephone station apparatus of FIG. 2.

Referring again to FIG. 1, the following details the steps taken by telephone station apparatus comprising telephone 12 and computer terminal 14 in interacting with VMS 30 and web server 32 to effect call control of a call originating at telephone 12 and diverted to VMS 30. This occurs is the following way, referring to FIGS. 1 and 9:

(I) a caller at telephone station apparatus initiates a call from telephone 12 (Step 1210);

(II) receiving graphical call control data on a display of the telephone station's computer terminal (Step 1220). Typically, this data will be world wide web files that are displayed (Step 1225) using the GUI of computer terminal 14;

(III) issuing call control commands through the terminal (Step 1230). The call control commands will be issued by the caller using input devices, such as the keyboard and mouse.

Steps 1220 and 1230 are repeated as the call proceeds to continue navigating through a hierarchy of menus or to select navigational options.

Referring again to FIG. 1, in another embodiment of the present invention, central office 26 is connected to PBX 36, which in turn is connected to both a plurality of telephone handsets, such as handset 42, and to a voice messaging system (VMS) 38. VMS 38 is in turn connected to a web site server 40 which is interfaced to data network 24. A call may originate at telephone handset 12 and be intended for telephone 42. If the call is diverted to VMS 38, then in the above described ways, call control could be exercised by the caller from computer terminal 14 by way of URL's and data exchange between computer terminal 14 and web server 40. It should be noted that a table 54 could be associated with PBX 36 that functions in the same way as table 50 associated with CO 26.

Figure 10:
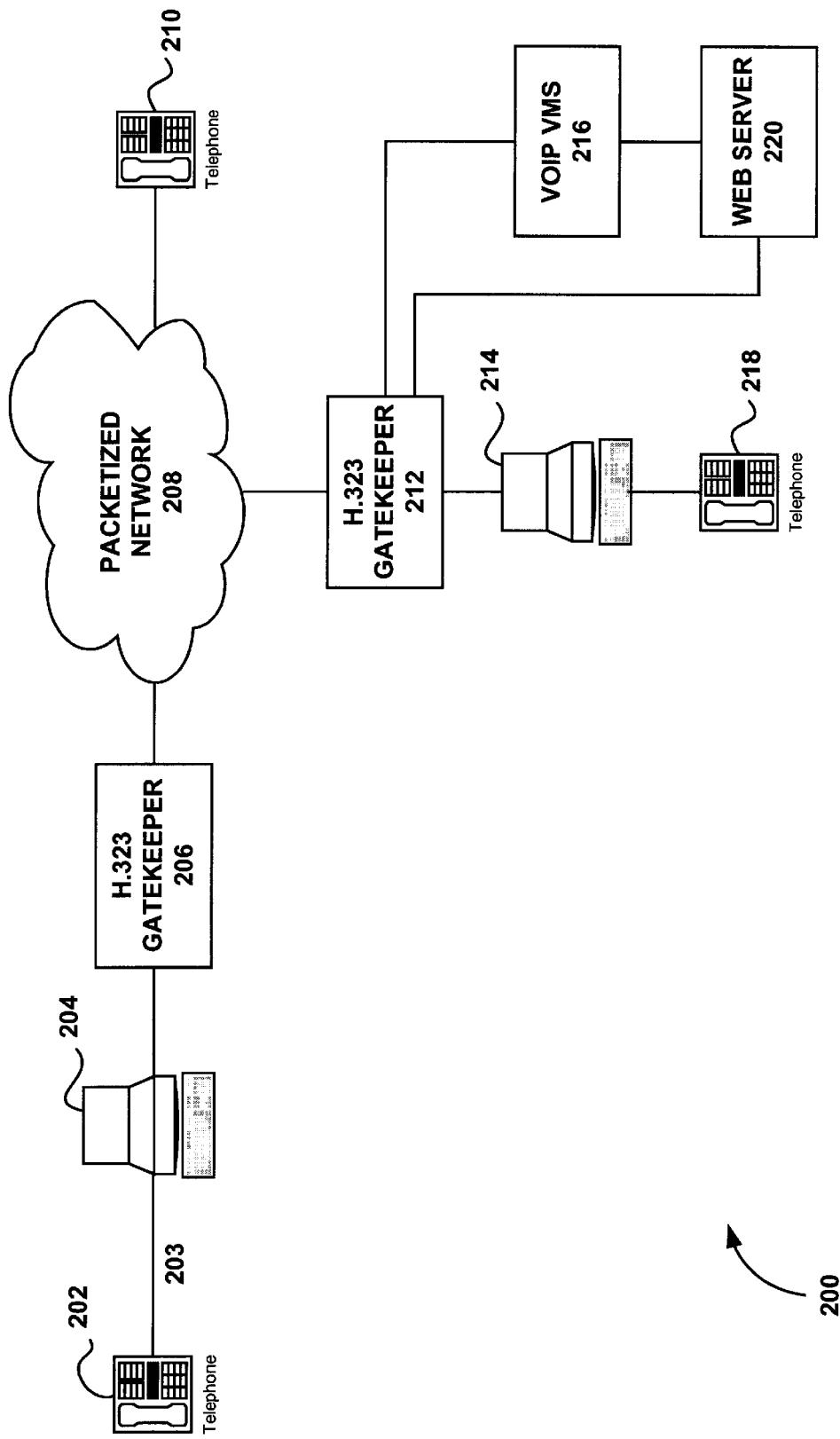
FIG. 10 is a schematic drawing of a computer network in accordance with another embodiment of the invention.

FIG. 10 shows another embodiment of the present invention based on a data network system 200. In this embodiment, call control is achieved using a graphical user interface of a voice-over-internet call. As shown in FIG. 10, telephone handset 202 is connected to computer terminal 204, possibly by way of a Universal Serial Bus connection 203. Computer terminal 204 is attached to H.323 gatekeeper 206.

The International Telecommunication Union (ITU) H.323 standard provides a foundation for audio, video, and data communications across IP based networks, including the Internet. By complying with H.323, multimedia products and applications from multiple 45 vendors can interoperate, allowing users to communicate without concern for compatibility. Voice over IP standards such as H.323 will be the keystone for LAN-based products for consumer, business, entertainment, and professional applications.

H.323 is an umbrella recommendation from the International Telecommunications Union (ITU) that sets standards for multimedia communications over Local Area Networks (LANS) that do not provide a guaranteed Quality of Service (QoS). These networks dominate today's corporate desktops and include packet-switched TCP/IP and IPX over Ethernet, Fast Ethernet and Token Ring network technologies. Therefore, the H.323 standards are important building blocks for a broad new range of collaborative, LAN-based applications for multimedia communications.

The H.323 specification was approved in 1996 by the ITU's Study Group 15. The standard is broad in scope, and includes both stand-alone devices and embedded personal computer technology as well as point-to-point and multi point conferences.

The standard addresses call control, multimedia management, and bandwidth management for point-to-point and multi point conferences. H.323 also address interfaces between LANs and other networks.

H.323 Gatekeepers perform two important call control functions which help preserve the integrity of a corporate data network. The first is address translation from LAN aliases for terminals and gateways to IP or IPX addresses, as defined in the RAS specification. The second function is bandwidth management, which is also designated within RAS. For instance, if a network manager has specified a threshold for the number of simultaneous conferences on the LAN, the Gatekeeper can refuse to make any more connections once the threshold is reached. The effect is to limit the total conferencing bandwidth to some fraction of the total available; the remaining capacity is left for e-mail, file transfers, and other LAN protocols. The collection of all Terminals, Gateways and Multi point Control Units managed by a single gatekeeper is known as an H.323 Zone.

While a Gatekeeper is logically separate from H.323 endpoints, such as computer terminal 204, Gatekeeper functionality can be incorporated into the physical implementation of Terminals, Gateways or multipoint conference units.

A Gatekeeper is not required in an H.323 system. However, if a Gatekeeper is present, it is mandatory that terminals make use of the services offered by gatekeepers. These services, that are defined in RAS include address translation, admissions control, bandwidth control, and zone management. The functioning of the Gatekeeper are detailed in the following tables:

| Required Gatekeeper Functions | |
|---|---|
| Address Translation | Translation of alias address to Transport Address using a table that is updated with Registration messages. Other methods of updating the translation table are also allowed. |
| Admissions Control | Authorization of LAN access using Admission Request, Confirm and Reject (ARQ/ARC/ARJ) messages. LAN access may be based on call authorization, bandwidth, or some other criteria. Admissions Control may also be a null function which admits all requests. |
| Address Translation | Translation of alias address to Transport Address using a table that is updated with Registration messages. Other methods of updating the translation table are also allowed. |
| Bandwidth Control | Support for Bandwidth Request, Confirm and Reject (BRQ/BCF/BRJ) messages. This may be based on bandwidth management. Bandwidth Control may also be a null function which accepts all requests for bandwidth changes. |
| Zone Management | The Gatekeeper provides the above functions for terminals, MCUs and Gateways which have registered within its Zone of control. |

| Optional Gatekeeper Functions Include: | |
|---|---|
| Call Control Signalling | In a point to point conference, the Gatekeeper may process Q.931 call control signals. Alternatively, the Gatekeeper may send the endpoints G.931 signals directly to each other. |
| Call Authorization | The Gatekeeper may reject a call from a terminal based on the Q.931 specification. The reasons for rejection may include, but are not |

-continued

Optional Gatekeeper Functions Include:

| | |
|---|---|
| | limited to, restricted access to/from particular terminals or Gateways, restricted access during certain periods of time. The criteria for determining if authorization passes or fails is outside the scope of H.323. |
| Bandwidth Management | The Gatekeeper may reject calls from a terminal if it determines that sufficient bandwidth is not available. This function also operates during an active call if a terminal requests additional bandwidth. The criteria for determining if bandwidth is available is outside the scope of 11.323. |
| Call Management | The Gatekeeper may maintain a list of ongoing 11.323 calls in order to indicate that a called terminal is busy or to provide information for the Bandwidth Management function. |

Call setup messages are sent on the first TCP connection the caller establishes to the callee. Four call setup messages are necessary for simple conferences. Their use and syntax are defined in ITU standards H.225.0 and Q.931. The necessary messages are:

Setup
Alerting
Connect
Release Complete

The caller sends Setup to initiate the conference immediately after establishing the TCP connection. The Setup message contains the caller's name and IP address. The callee sends Alerting after notifying the user of the incoming call, if the call will not be accepted without user intervention. The callee send Connect to accept the call or Release Complete to refuse the call. The Connect message contains the address and port on which the callee is listening for the H.245 connection.

Either Alerting, Connect, or Release Complete must be sent by the callee immediately upon receipt of Setup; one of these must be received by the caller before its setup timer expires. After Alerting is sent, the other party has up to 3 minutes to accept or refuse the call.

The following fields of the Setup message carry useful information for simple point-to-point conferences. (Some of these fields are in the Q.931-defined part, and some are in the H.225.0-defined extensions. See H.225.0 and Q.931 for information on the content and formatting of these fields).

(1) Display—should contain caller name for display to the callee;
(2) SourceInfo—manufacturer and product version information source,
(3) CallSignalAddress—IP address of caller.

The following additional fields must be included as part of the syntax. Except as noted, they may have fixed values for all simple conferences:

(a) Protocol discriminator
(b) Call reference—unique for simultaneous calls
(c) Message type
(d) Bearer capability
(e) protocolIdentifier
(f) desCallSignalAddress—IP address of callee
(g) activeMC
(h) conferenceID—unique for every call
(i) conferenceGoal
(j) callType In overview, referring to FIG. 10, a call from telephone handset 202 to telephone handset 218 would first pass through computer terminal 204 and then through H.323 gatekeeper 206. H.323 gatekeeper 206 would exchange call setup messages with H.323 gatekeeper 212. The setup messages contain the IP addresses of both the called party and the calling party. If the call control is diverted to VOIP VMS 216, then H.323 gatekeeper 212 can pass the calling party IP address to web server 220. Web server 220, in turn can send a call control URL to computer terminal 204, by way of packetized network 208.

Then, as described above, terminal 204 may display menu of choices which will result in call control commands. The caller can therefore input commands into computer terminal 204 to control the VOIP Voice-mail system 216.

Figure 11:
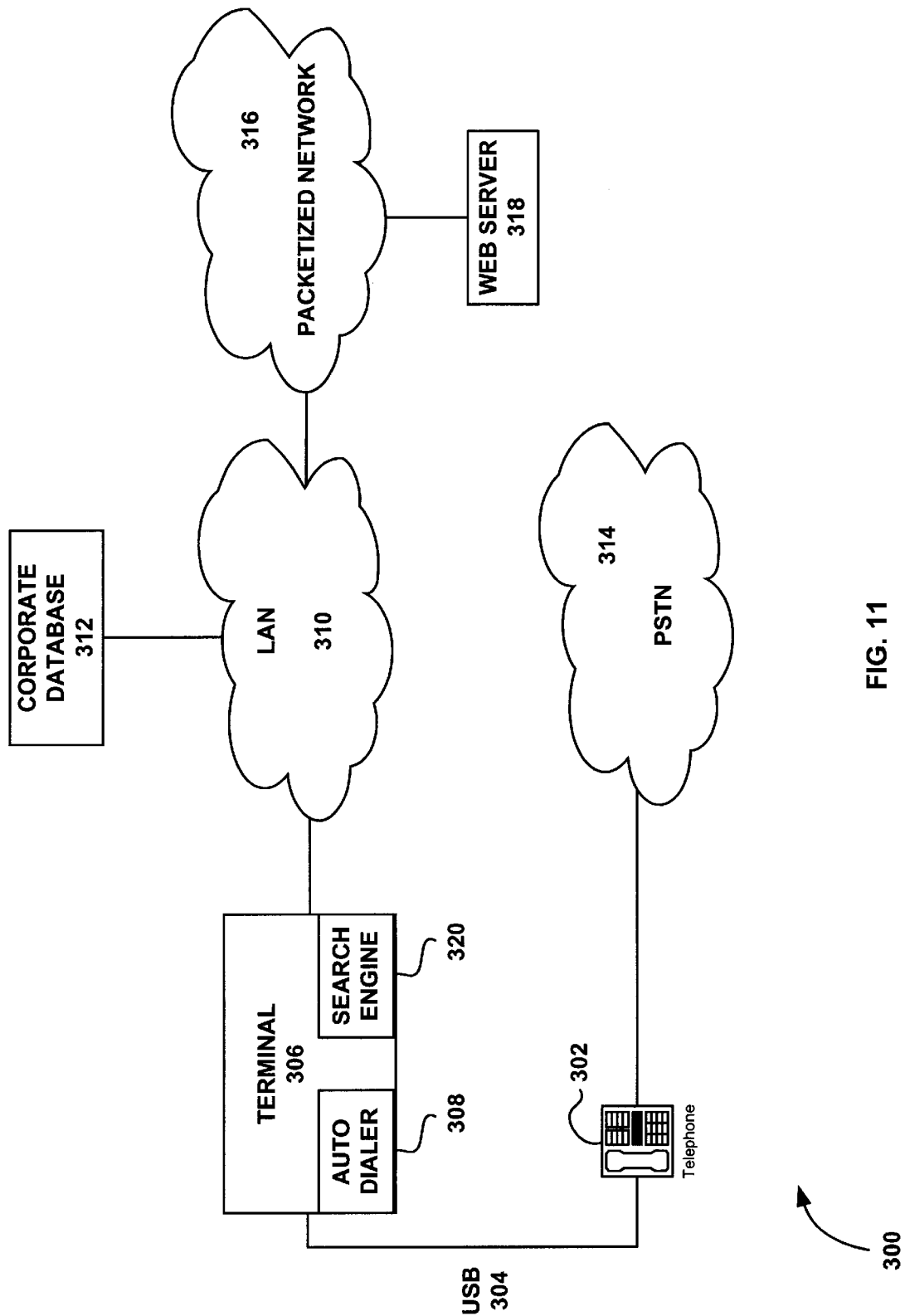
FIG. 11 is a schematic drawing of a computer network and a telephone network in accordance with another embodiment of the invention.

Referring to FIG. 11 a data network is shown generally at 300. Telephone handset 302 is connected to computer terminal 306 by way of USB connection 304. Computer terminal 306 has in its memory Auto-dialler program 308 and IP address search engine 320. Telephone handset 302 is connected to PSTN 314 and computer terminal 306 is connected to local area network 310 which in turn is connected to packetized data network 316.

Auto-dialler program 308 allows a computer user to select the name of the person to be called using the computer's graphical user interface (GUI). Once the name has been selected, the auto-dialler places the telephone call via telephone 302 which is connected to computer terminal 306 via USB connection 304.

Figure 12:
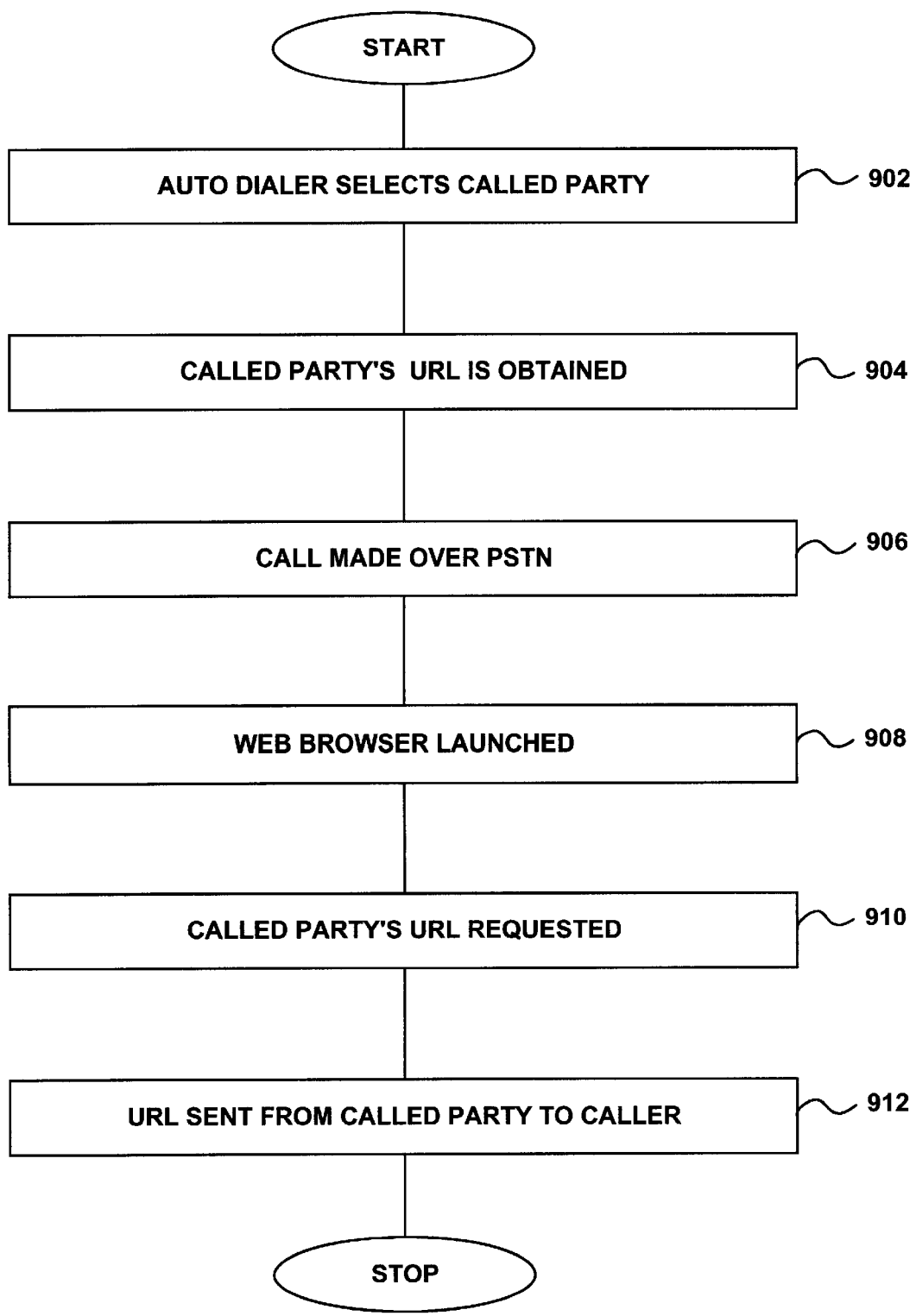
FIG. 12 is a flow chart illustrating a portion of the software control of the system of FIG. 10.

In this embodiment, a world-wide web page of the called party is displayed at the same time that a telephone call is placed. The method by which this occurs is described below and shown in FIG. 12:

(A) The caller selects the called party on the auto-dialler 308 (Step 902).
(B) The called party's URL is obtained by engine 320 (Step 904).
(C) The call is made from telephone handset 302 over PSTN 314 (Step 906).
(D) A web browser is launched on caller's computer terminal 306. (Step 908) Alternately, the web browser could run continuously.
(E) A message is sent from computer terminal 306 over LAN 310 and data network 316 to the called party's web server 318 on which the called party's URL is found using the caller's IP address as the return address (Step 910).
(F) The data comprising the URL is sent from web server 318 back to computer terminal 306 (Step 912).

There are various methods by which the called party's URL can be obtained (Step 904). For example, LAN 310 may have an associated corporate database 312. This database can have a table which matches called numbers to a called party's URL. Thus, to obtain the called party's URL, auto-dialler 308 employs search engine 320 to send a message containing the called number to corporate database 312. This database queries the table to see if it contains the called number. If it does, the called number and its corresponding URL is sent to computer terminal 306 in a second message.

Figure 13:
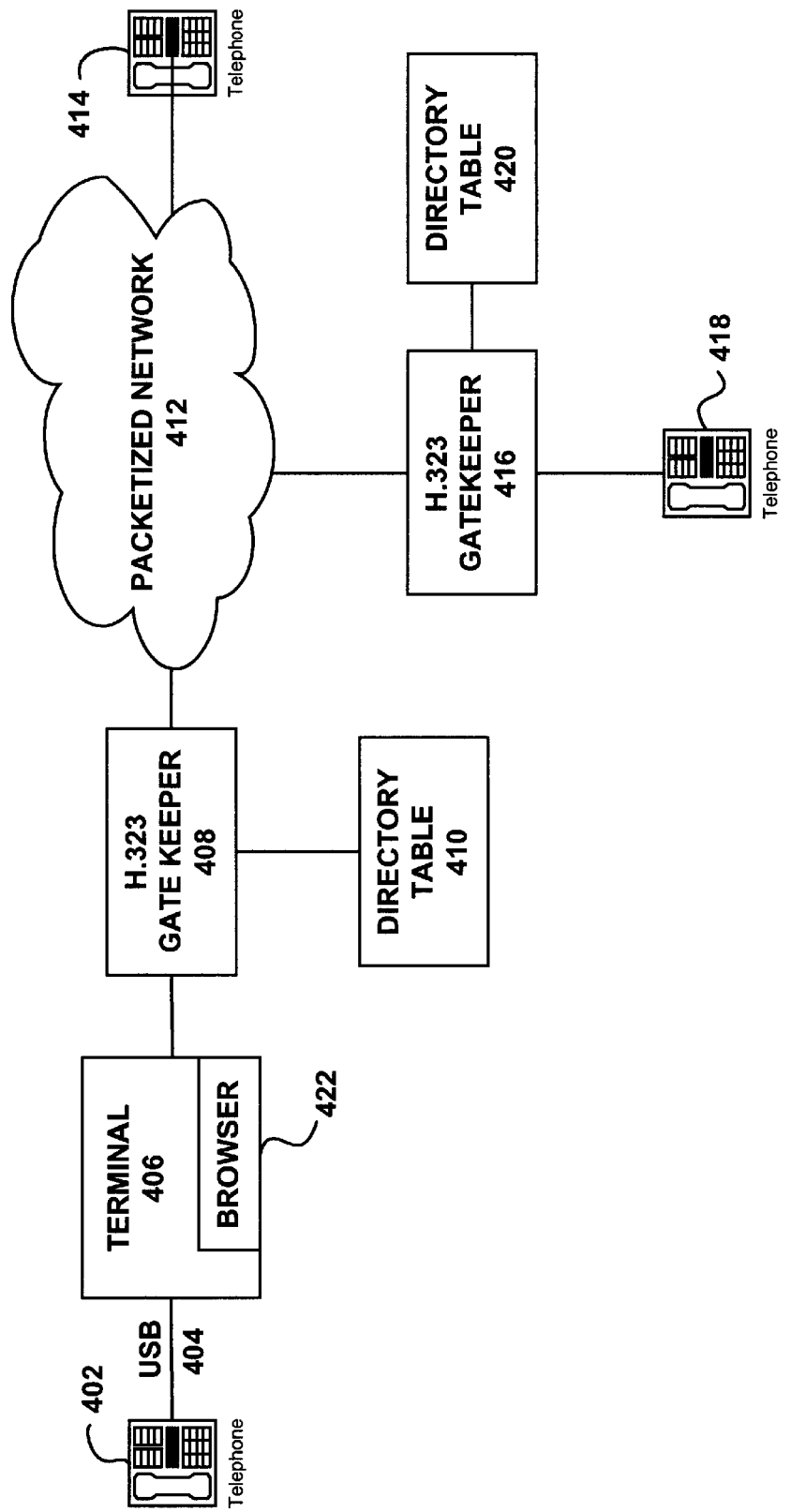
FIG. 13 is a schematic drawing of a computer network in accordance with another embodiment of the invention.

Referring to FIG. 13, a system for displaying a world-wide web page of a party called using voice over internet is shown. Telephone handset 402 is connected to computer terminal 406 via USB connection 404. A call is placed from telephone handset 402 to telephone handset 418 via H.323 gatekeeper 408 through data network 412 to H.323 gateway 416. The web page of the called party is displayed on the display of computer terminal 406 in the following manner:

(A) A caller places a call on telephone 402.

(B) A program running on terminal 406 tries to find the called number on directory table 410 (associated with H.323 gateway 408) or on directory table 420 (associated with H.323 gatekeeper 416). These directory tables have a list of numbers and associated URL'S. If a match to the called number is obtained, the URL is returned in a second message to computer terminal 406.

(C) Browser program 422 running on computer terminal 406, attempts to request the called party URL contained in the second message.

Once the caller has the called party's web page it could be used for a number of possible functions, such as a video link, data interchange, or access to a common "whiteboard" computer application. It should be noted that in each of the above noted scenarios, optionally, a call could be forwarded to a receptionist if no call control action was received over the internet within a preset time limit.

Figure 14:
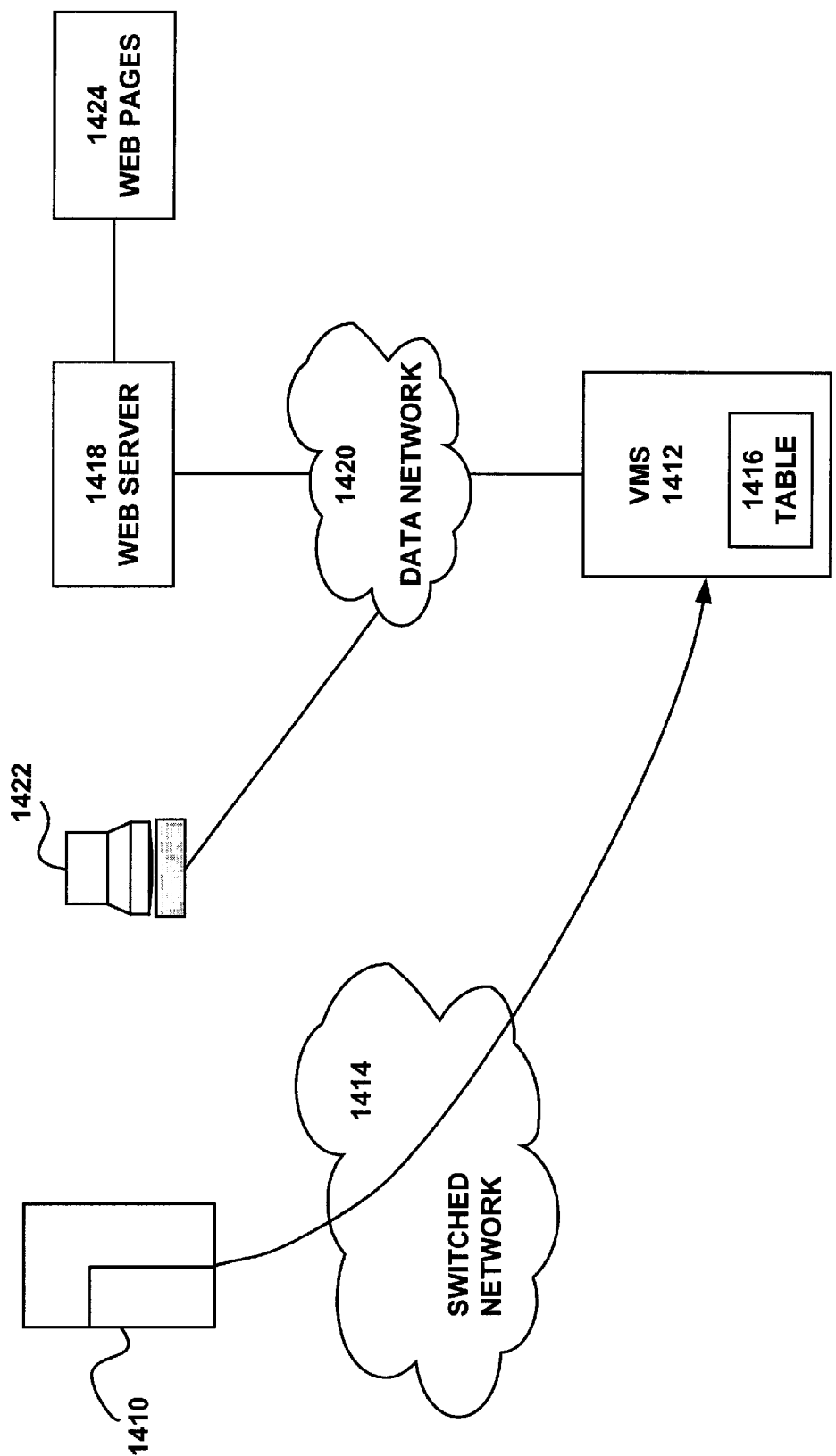
FIG. 14 is a schematic diagram of a system including data network and a switched network in accordance with an embodiment of the present invention.
Figure 15:
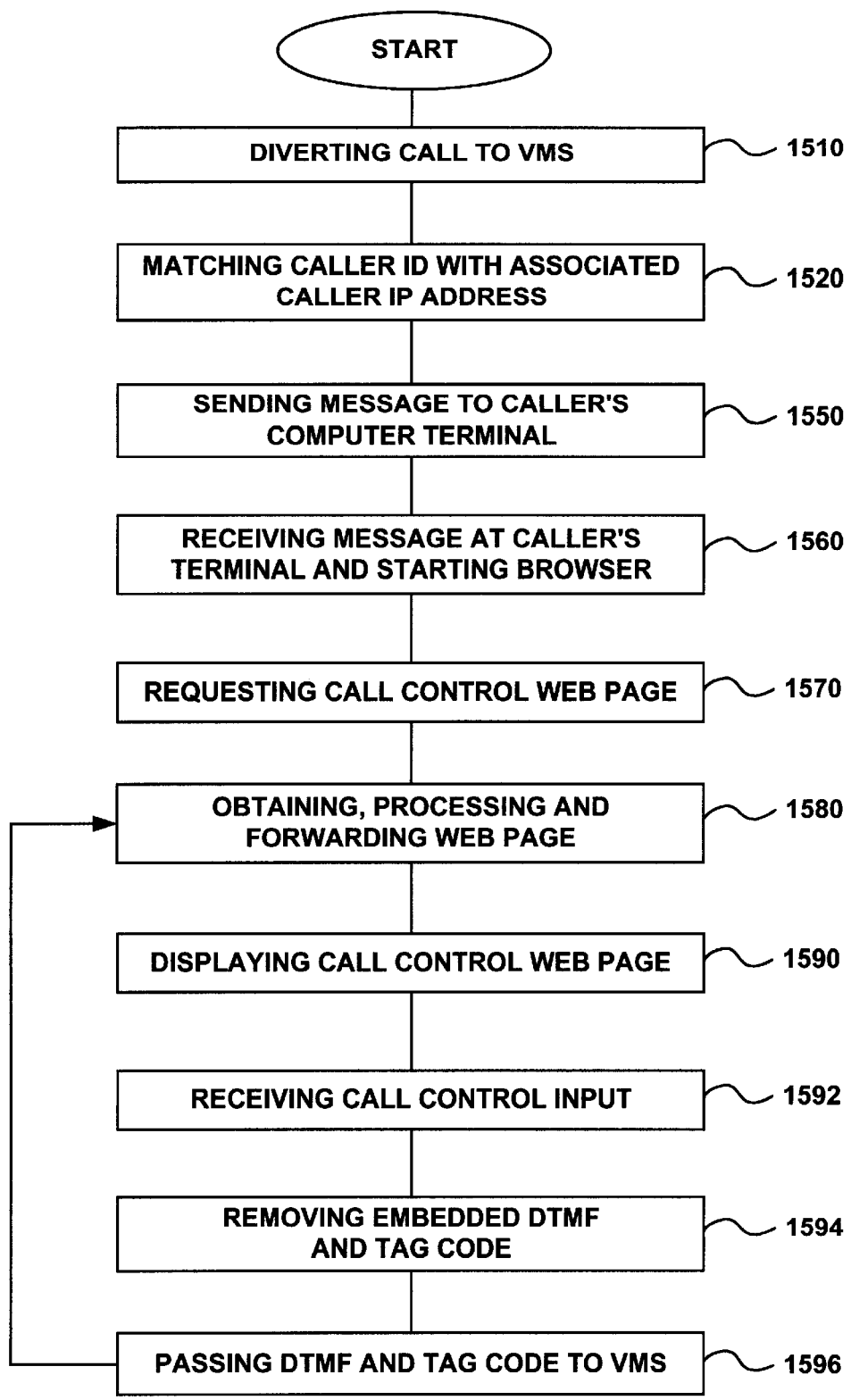
FIG. 15 is a flow chart showing a portion of the software control of the system of FIG. 14.

Referring to FIG. 14, another system embodying the invention comprises a telephone 1410 connected to switched network 1414 which has a VMS 1412. VMS 1412 includes a look-up table 1416. The system also has a computer terminal 1422 (proximate telephone 1410) connected to data network 1420. A web server 1418, which has a database 1424 of web pages, is also connected to data network 1420. Data network 1420 is also connected to VMS 1412. The operation of the system of FIG. 14 is described by the following method which is illustrated in FIG. 15.

Computer terminal 1422 passes the Caller ID of its associated telephone handset 1410 along with its IP address to web server 1418 over data network 1420. Preferably, when computer terminal 1422 is first started it enrolls with web server 1418 to create a table entry with Caller ID and caller IP Address. The table entry is stored in table 1424 associated with the web server. The Caller ID for this enrollment process may be made known to computer terminal 1422 when this computer terminal is installed and connected to data network 1420. Alternatively, the person using both telephone handset 1410 and computer terminal 1422 could input their Caller ID (phone number) to the terminal in response to a prompt. The look-up table 1424 is necessary when Caller IP addresses are generally not accessible to the other devices on data network 1420. This will generally be the situation if the caller's computer terminal is part of a local area network or if computer terminal 1422 accesses data network 1420 by way of a dial-up connection (or other type of connection) to an Internet Service Provider. In these cases, web server 1418 functions as a proxy server, which determines which local IP addresses are visible to, or accessible by, other devices on data network 1420.

A background program is run on computer terminal 1422. This background program monitors for activity on a specific Internet port address (which port address is determined by the protocol used by the terminal). A call then may proceed as follows:

(I) A caller places a call from telephone handset 1410, via switched network 1414 which is diverted to VMS 1412 (step 1510);

(II) At VMS 1412, a look-up table 1416 is situated in memory which matches the Caller ID to an internet address associated with the Caller ID. Thus, in the table, a Caller ID of a telephone is matched with a Caller IP address which addresses a terminal associated with (i.e., proximate) the telephone. Look-up table 1416 is created by having an administrator enter data into the table. This can be automated by scanning and reading information found on other databases (step 1520).

(III) An http message is constructed by the VMS 1412 and sent to the terminal 1422 via data network 1420 (step 1550). This message contains a number of parameters: "TAG", which is an identifier of the call-in-progress (where the VMS operates in accordance with an object-oriented program, the TAG will identify the instance of the object which represents the call-in-progress). "CLID", the Caller ID, which is an identifier of the caller; "web page", an address where a call control web page can be found—this address identifies web server 1418 and a specific CGI script on the web server. "CMD" which tells a target computer terminal 1422 whether to open or close a browser program; and, "App" which indicates which program on terminal 1422 the command CMD is intended for.

(IV) In response to CMD=Open and App=Browser, the background program causes the browser program to begin running on computer terminal 14 (step 1560), with an initial URL to be browsed that consists of the value of the Web Page parameter followed by the TAG, CLID, and Caller IP address name=value pairs. The Web Page parameter value specifies the URL of a CGI script running on a web server with a name=value pair of Adrs=URL of the web page to be browsed. The browser program thus sends an http message to the CGI script of web server 1418 over data network 1420 with the noted parameters. (Step 1570)

(V) Upon receiving the http message from the browser that was sent in the previous step, the CGI script reads the web page specified as the value of the Adrs parameter and replaces generic references to a call instance in a web page with references to the specific call instance. These references to a call instance are associated with each embedded hyperlink in the web page. Additionally, a DTMF code is associated with each embedded hyperlink. Thus, the CGI script inserts the TAG, CLID and Caller IP address name=value pairs before each embedded hyperlink URL, with the hyperlink URL being preceded by Adrs=so as to make it into a parameter for the CGI script. For example, a hyperlink in the web page could be transformed from <A HREF="http://webserveradrs/WebPg.html">[DTMF=3]Menu Item 3</A> to <HREF="http://cgiwebserveradrs/cgi-bin/cgiscript.p1?TAG=12345678&CLID=19998887777&CallerIP=99.999.99.99&Adrs=http://webserveradrs\WebPg.htmp&DTMF=3>MenuItem3</A> where "DTMF=3" represents the call control action. The modified web page is returned to the browser that requested it (step 1580). It will therefore be apparent that when the call control web page was created, each hyperlink was written to point to a URL, as is conventional. However, additionally, each hyperlink had an area for insertion of the identifier of a call instance and of a DTMF code which corresponds to a DTMF code that a telephone caller would generate if implementing the same call control action as the action associated with the hyperlink on the call control web page.

(VI) The call control web page is received and displayed at computer terminal 1422 (step 1590). This web page includes text or graphics indicating call control actions and associated "hot buttons". A hot button could simply be highlighted text indicating a call control action. Each hot button represents one of the embedded hyperlinks, associated with a call control action.

(VII) Computer terminal 1422 receives input when the caller points and clicks on various hyperlinks on the Call Control Web page (step 1592). This results in the hyperlink message being passed to the web server 1418.

(VIII) When the CGI script at the web server receives the hyperlink message that was generated when the caller clicked on a hyperlink in the call control web page, it detects the DTMF=value and TAG=value parameters (step 1594) and it sends the value of these parameters to VMS 1412 using TCP/IP messaging for call control. (Step 1596) The TAG parameter allows the VMS to identify the call instance and apply the call control action indicated by the DTMF value. The CGI script then processes the call control web page (which may be a new web page) addressed by the URL in the hyperlink message so as to reference the specific call instance (in the same manner as is described in step V), generating a new web page which is sent to the terminal. The new web page may contain sub-menus of call control options or other information for the caller to view. (Steps 1580, 1582)

Preferably, the call control data from computer terminal 1422 to web server 1418 could include, besides embedded DTMF codes, other codes or commands, such as "Music on Hold" that would allow VMS 1412 to handle the call in a different way.

It is also preferred that a second CGI-voice-menu script at web server 1418 transforms input signals from the caller and passes them on to VMS 1412 for call control. This CGI-voice menu script also passes and receives further data to and from computer terminal 1412.

As described, the logic and data for call control is implemented only through the structure (contents) of the web pages and the relationships (links) between different web pages. The web page may be created by any one of a number of web page creation tools, such as Front Page™.

Thus, when a call control command is received from computer terminal 1422 the command is extracted and passed onto VMS 1412 and is used to change the state of the call control logic in VMS 1412.

An advantage of this method is that it is not necessary to pass change of state information from VMS 1412 to web server 1418 after receiving call control commands from computer terminal 1422. A further advantage of this implementation is that call control commands can be received at VMS 1412 from both computer terminal 1422 and as DTMF commands from telephone handset 1410 via switched network 1414. This is helpful, if for example, data transmission is slow over data network 1420, as can occasionally happen with Internet data transmission. Optionally, the call control web pages displayed at computer terminal 1422 also display as part of the GUI, the equivalent key on DTMF code that would have to be pressed by the caller. In this way, if the caller has not been listening to the voice or voice-synthesized messages coming from VMS 1412 which are broadcast simultaneously with call control data being displayed (using the GUI of computer terminal 1422), then they can still use the keypad of telephone handset 1410 to input call control commands.

One problem with allowing call control data to be transmitted by either telephone handset 1410 or by computer terminal 1422 and not having call control state information passed from VMS 1412 to web server 1418 is that the call control logic in web server 1418 and the call control logic in VMS 1412 can become unsynchronized. Colloquially, web server 1418 will not be aware of commands input via telephone handset 1410. This may cause computer terminal 1422 to display irrelevant call control web pages. Preferably, computer terminal 1422 also displays an image of a button, which, when pressed, will send a message to the CGI-voice menu script running on web server 1418 with a re-synch parameter. The CGI voice menu script sends this via a TCP/IP message to VMS 1412. In response, VMS 1412 sends a URL or web page address or other code or data to the CGI voice menu script running on web server 1418 which corresponds to, or indicates, the current call control (voice menu) state of VMS 1412. The correct web page address is then sent to computer terminal 1422 after processing to reference the specific call instance. In this way, the caller can again use the web browser on computer terminal 1422 to enter commands if he or she has entered in some call control commands using telephone handset 1410.

An advantage of displaying call control information on a graphical user interface is that it is possible to display more information than would usually be broadcast at a single instance with voice-recorded or voice-synthesized output from a traditional VMS. In other words, a graphical user interface could simultaneously display many levels of a voice-menu hierarchy or tree. By using a GUI, a caller could immediately point and click on a hyperlink associated with a sub-level of the tree.

In a preferred embodiment, levels and sub-levels are simultaneously displayed on the GUI of computer terminal 1422. If a caller clicks on a sub-level hyperlink, then web server 1418 translates this input into a series of transformed DTMF codes (corresponding to both the sub-level selection and any higher levels). The series of DTMF codes is then transmitted to VMS 1412 via data network 1420. This provides the benefit that one click on a hyperlink portion takes the place of listening to a series of voice messages and entering a series of DTMF commands.

Figure 16:
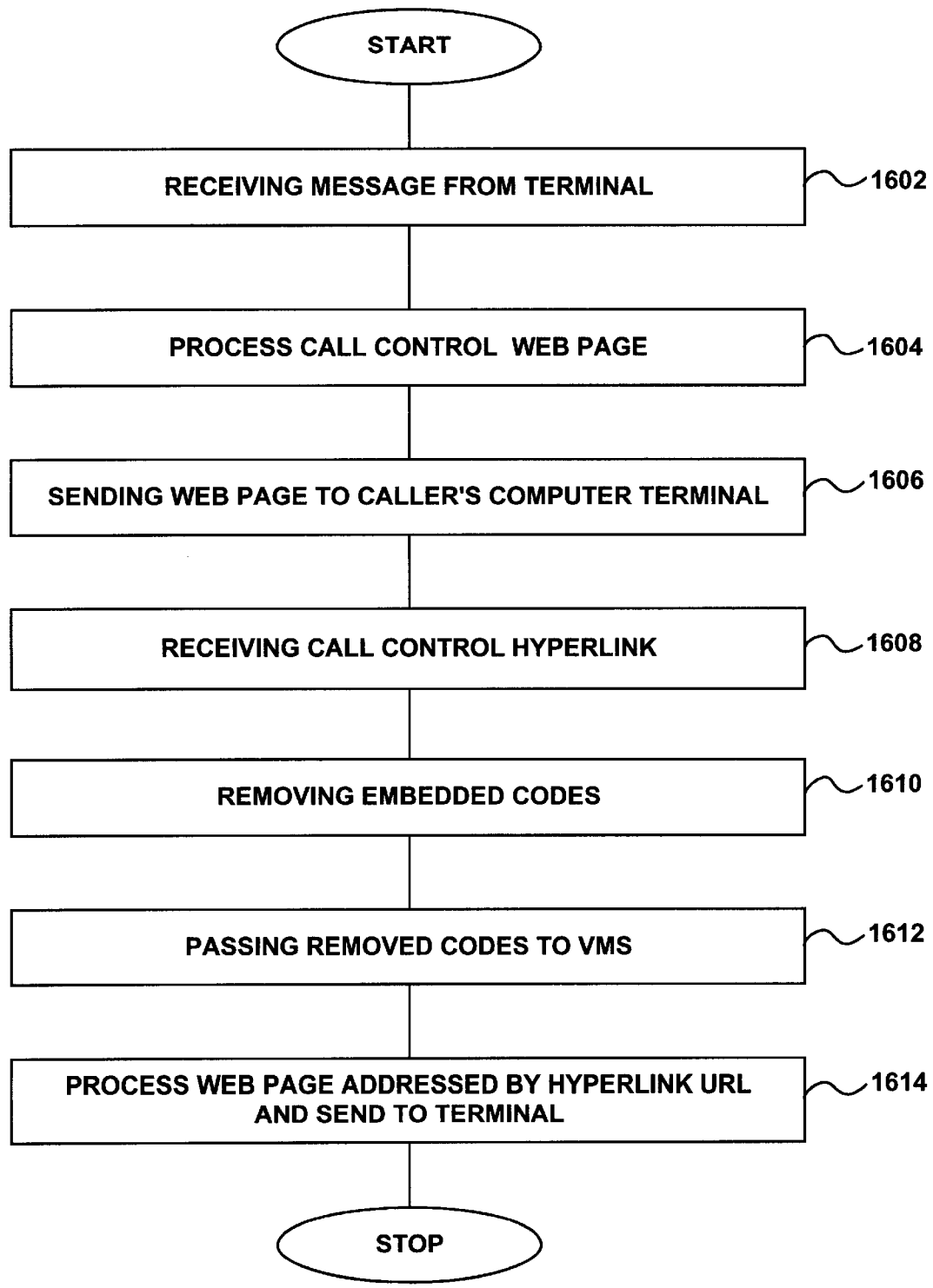
FIG. 16 is a schematic diagram of a system including a data network and a switched network in accordance with an embodiment of the present invention.

The following details the steps taken by web server 1418 in interacting with computer terminal 1422 and VMS 1412 to control a call that has originated from telephone 1410 and that has been diverted to VMS 1412. This comprises the following steps referring to FIG. 14 and FIG. 16:

(I) Receiving an http message from computer terminal 1422 via data network 1420. This message contains a number of parameters: TAG, which is an identifier of the call-in-progress; CLID, the caller ID, an identifier of the caller; web page, an address where a call control web page can be found (step 1602).

(II) Processing the call control web page to associate the specific call instance with each embedded hyperlink (step 1604).

(III) Sending a TCP/IP message from web server 1418 to computer terminal 1422 with the modified web page (step 1606).

(IV) Receiving a hyperlink (call control input) from computer terminal 1422 (step 1608).

(V) Removing from the received call control hyperlink the embedded codes (step 1610).

(VI) Passing these removed codes on to VMS 1412 (step 1612).

(VII) Processing call control web page addressed by hyperlink URL and passing this to the terminal (step 1614).

Figure 17:
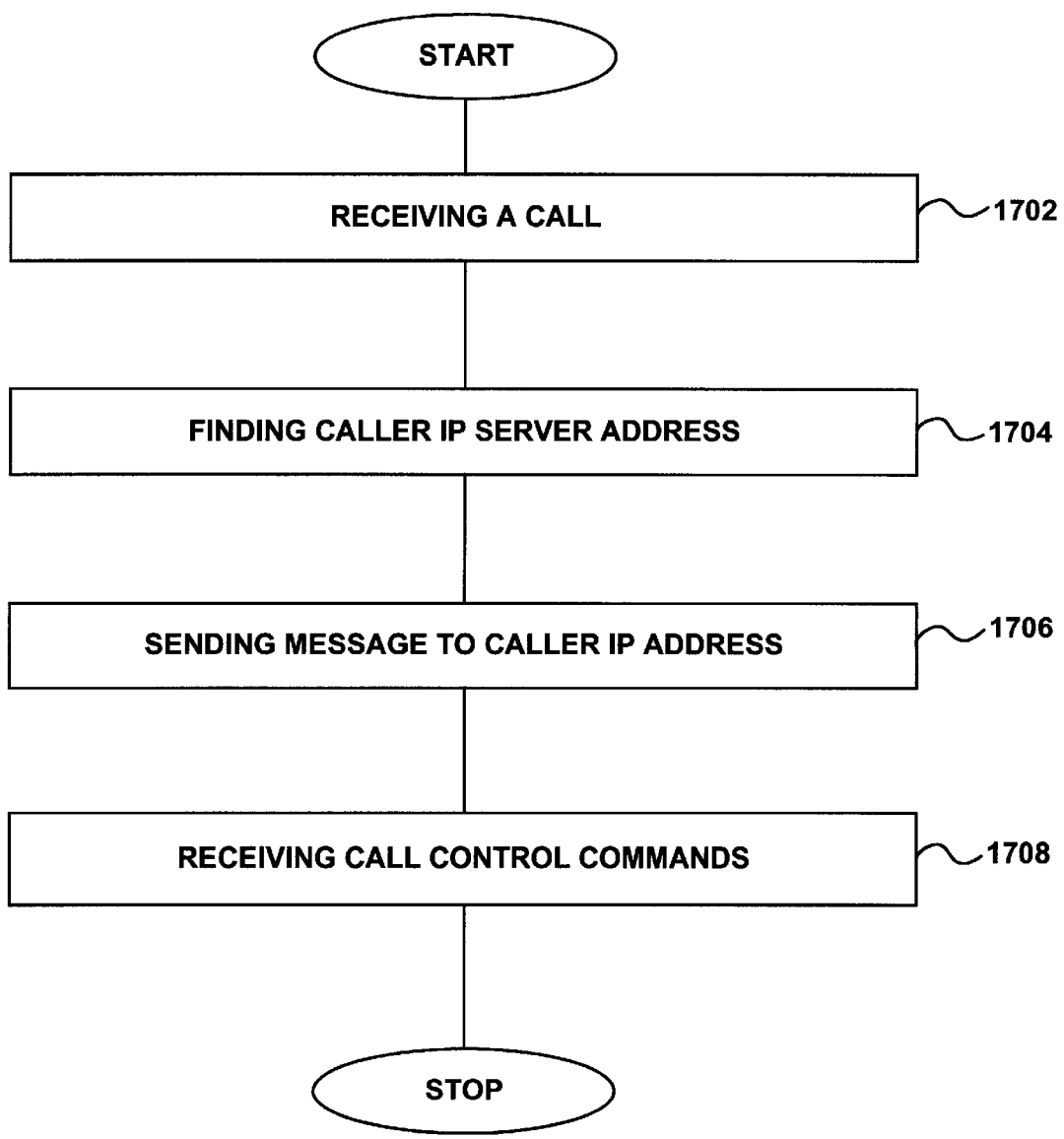
FIG. 17 is a schematic diagram of a system including a data network and a switched network in accordance with an embodiment of the present invention.

The following details the steps taken by VMS 1412 in interacting with web server 1418 to control a call that originated at telephone 1410. This comprises the following steps referring to FIG. 14 and FIG. 17:

(I) Receiving a call (step 1702);

(II) Finding a caller IP address corresponding to the caller ID (step 1704);

(III) Sending a message to the caller IP address. This message contains the parameters TAG, CLID, web page, CMD, and App (step 1706); and, (IV) Receiving call control codes from web server 1418 (step 1708).

Figure 18:
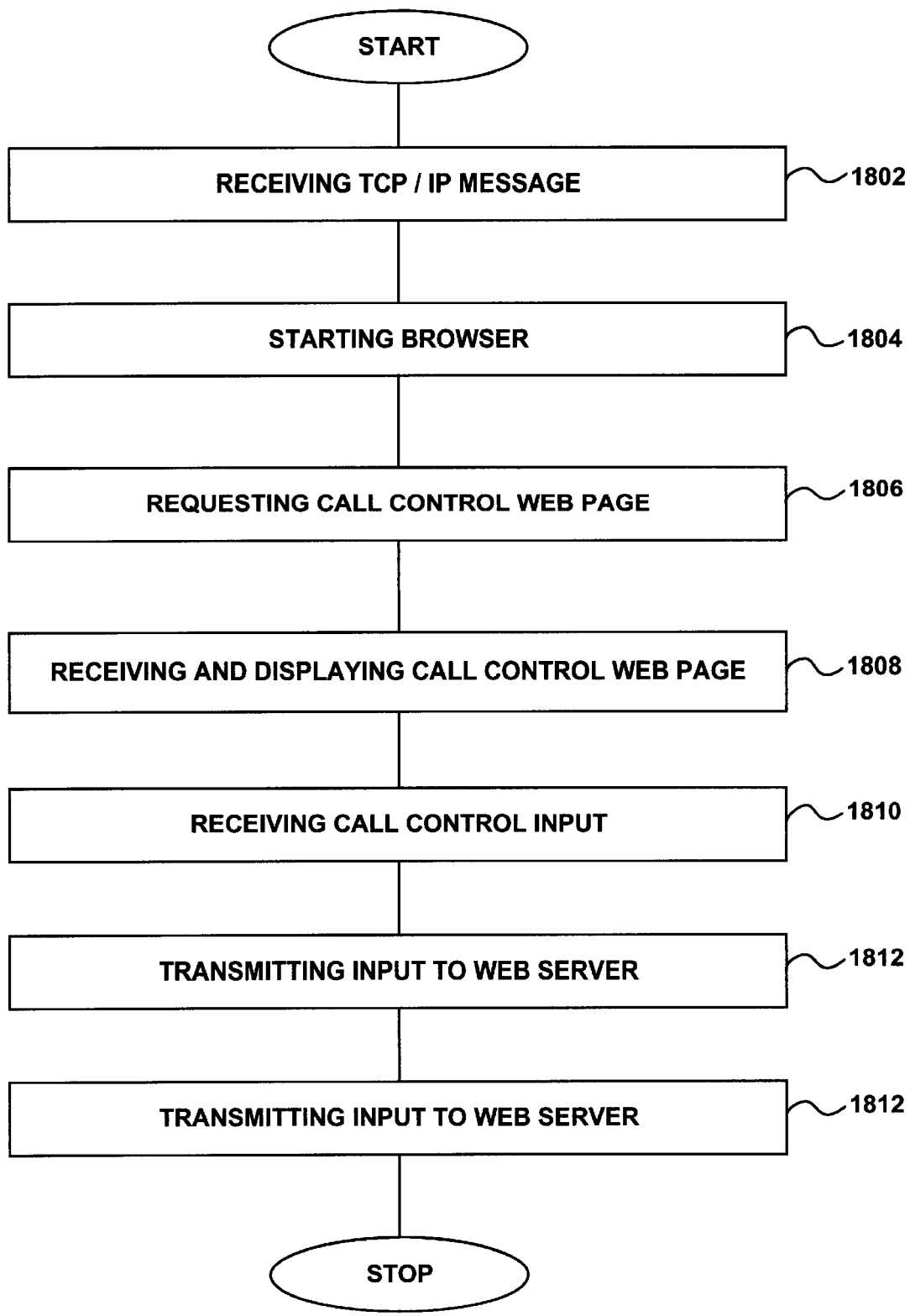
FIGS. 18, 19 and 20 are schematic diagrams showing portions of the software control of the system of FIG. 14.

The following details the steps taken by computer terminal 1422 in directing call control between telephone 1410 and VMS 1412. This comprises the following steps referring to FIG. 14 and FIG. 18:

(I) Receiving a TCP/IP message from VMS 1412. This message contains the parameters: TAG, CLID, Web Page, CMD and App (step 1802).

(II) Starting a browser program (step 1804).

(III) Taking the Web page parameter and requesting the Call Control Web page from the server on the data network 1420 where it resides (step 1806).

(IV) Receiving the (processed) call control web page and displaying it on computer terminal 1422 (step 1808).

(V) Receiving input when the caller points and clicks on various hyperlinks on the Call Control Web page (step 1810).

(VI) Transmitting the received input to web server 1418 (step 1812).

(VII) Receiving new Call Control Web pages and displaying same (step 1814).

It should be noted that browser programs, such as the program running on computer terminal 1422 can store information from TCP/IP messages. Preferably the value of certain of the parameters can be thus stored, to eliminate the need for their transmission after they are first received.

In another embodiment, the VMS does not send a call control web page address to the terminal in its initial http message. Instead, it merely sends the other parameters which identify the instance of the call and launch the browser (TAG, etc.). In response to this http message, the terminal launches its browser or another GUI program and looks to its own memory for a standardised call control page which will provide for basic standard call control functions such as record, delete and re-record message, etc. The terminal then substitutes the parameters identifying the specific call instance into the call control page in association with the "hyperlinks" of the page, then displays same to the user. In this simplified embodiement, the "hyperlinks" do not specify a URL of a web page on a server, but merely the server itself. On the user selecting a call control option (i.e., clicking on a hyperlink), call control information is sent to the web server associated with the VMS, DTMF codes are extracted by the server and sent on to the VMS. Because there is no web page URL specified in the hyperlink, the call control web page is not replaced at the terminal.

In a simplified embodiment, the call control web page may be merely to provide a user with a visual guide to the call control options which may be entered into the handset. In such instance, there will be no "hot buttons" on the page. This embodiment may be realised by the web page parameter specified by the VMS in its initial http message to the terminal pointing to a web page on server 1418 without hyperlinks.

Figure 19:
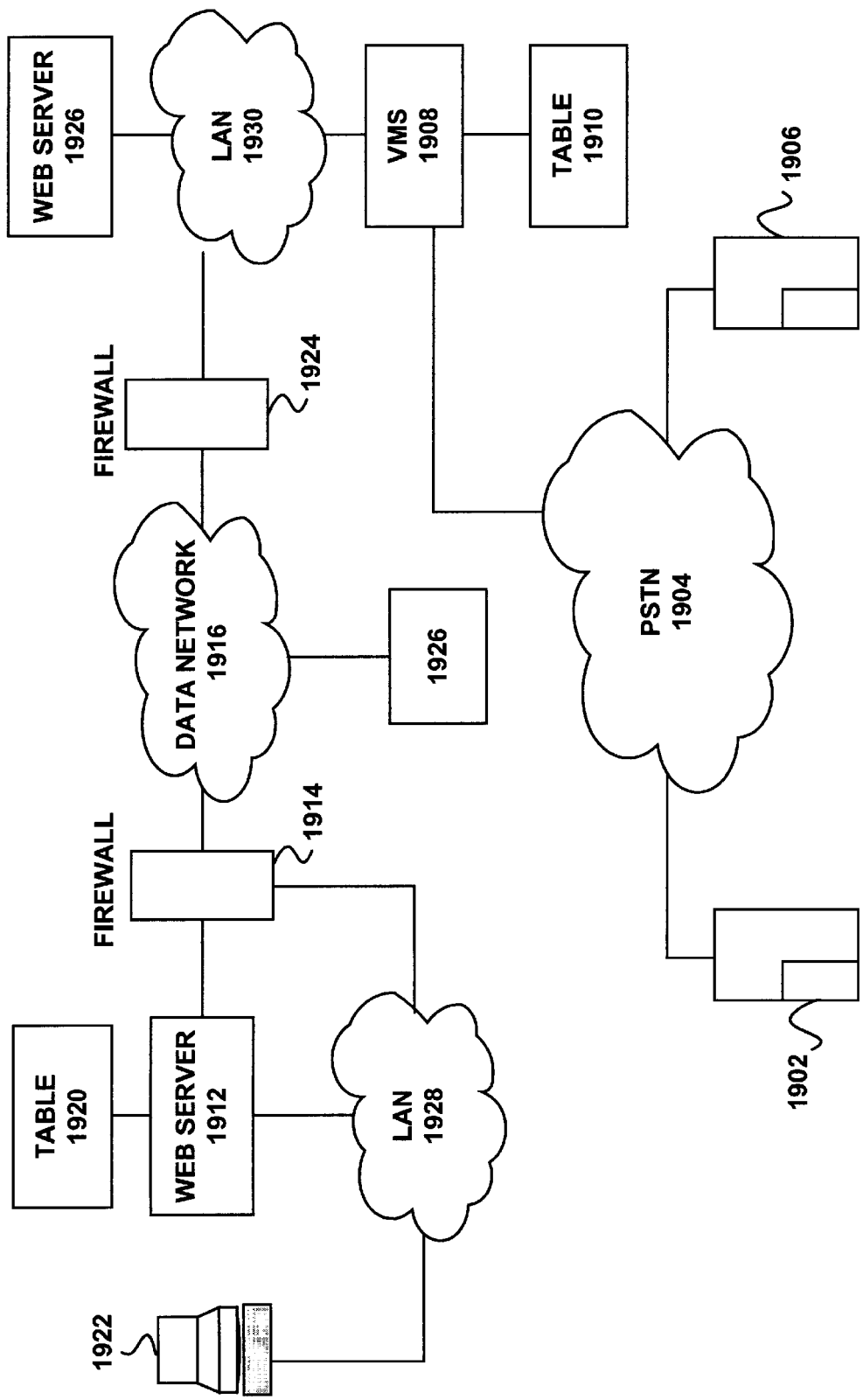

Referring to FIG. 19, there is shown a system embodying another aspect of the present invention which employs firewalls. As will be appreciated by those skilled in the art, firewalls are used to protect resources behind the firewall from unauthorized access. Firewalls also mean that the computer terminals inside the firewall are not addressable by resources outside the firewall. A caller situated at telephone handset 1902 places a call via PSTN 1904 to telephone handset 1906. The call is diverted to VMS 1908. At VMS 1908 a look-up occurs on a table 1910. The terminal 1922 associated with handset 1902 is not addressable by the VMS 1908 because of firewall 1914. Consequently, table 1910 matches the Caller ID to a Caller Web Server address (rather than to a caller IP address). Preferably table 1910 is implemented as a distributed database which is accessible via data network 1916. Such a database could be modelled on the DNS name system used in the Internet, or upon LDAP (Lightweight Directory Access Protocol) which is described in IETF publications, 1777, 1778 and 1823, which are hereby incorporated by reference for all purposes. Optionally, the database could be part of a server 1926 which is connected to data network 1916. Server 1926 could be a DNS or LDAP server. This Caller Web Server address is the address of web server 1912 which receives data from data network 1916 after it passes through firewall 1914. At web server 1912 there is look-up table 1920 which matches Caller ID to Caller IP address (the IP address associated with computer terminal 1922). The VMS 1908 therefore passes a message to web server 1912 with the parameters TAG, CLID, Caller ID, web page, CMD, and App. The web server 1912 determines the Caller IP address via table 1920, substitutes this, then sends the message on to terminal 1922 via LAN 1928. The steps in the handling of the call then proceed as described in conjunction with FIG. 15, steps 1560, et seq., except as follows. The web page parameter identifies web server 1926 associated with VMS 1908. Therefore, the http message from terminal 1922 is sent to web server 1926 over data network 1916 through firewalls 1914 and 1924 (and LAN 1930). Similarly, when the caller points and clicks on various call control hyperlinks, computer terminal 1922 receives input that is then transmitted over data network 1916, through firewalls 1914 and 1924, and to web server 1926 through LAN 1930. Also, call control web pages destined for terminal 1922 are addressed to web server 1912 which passes them on to the terminal.

Figure 20:
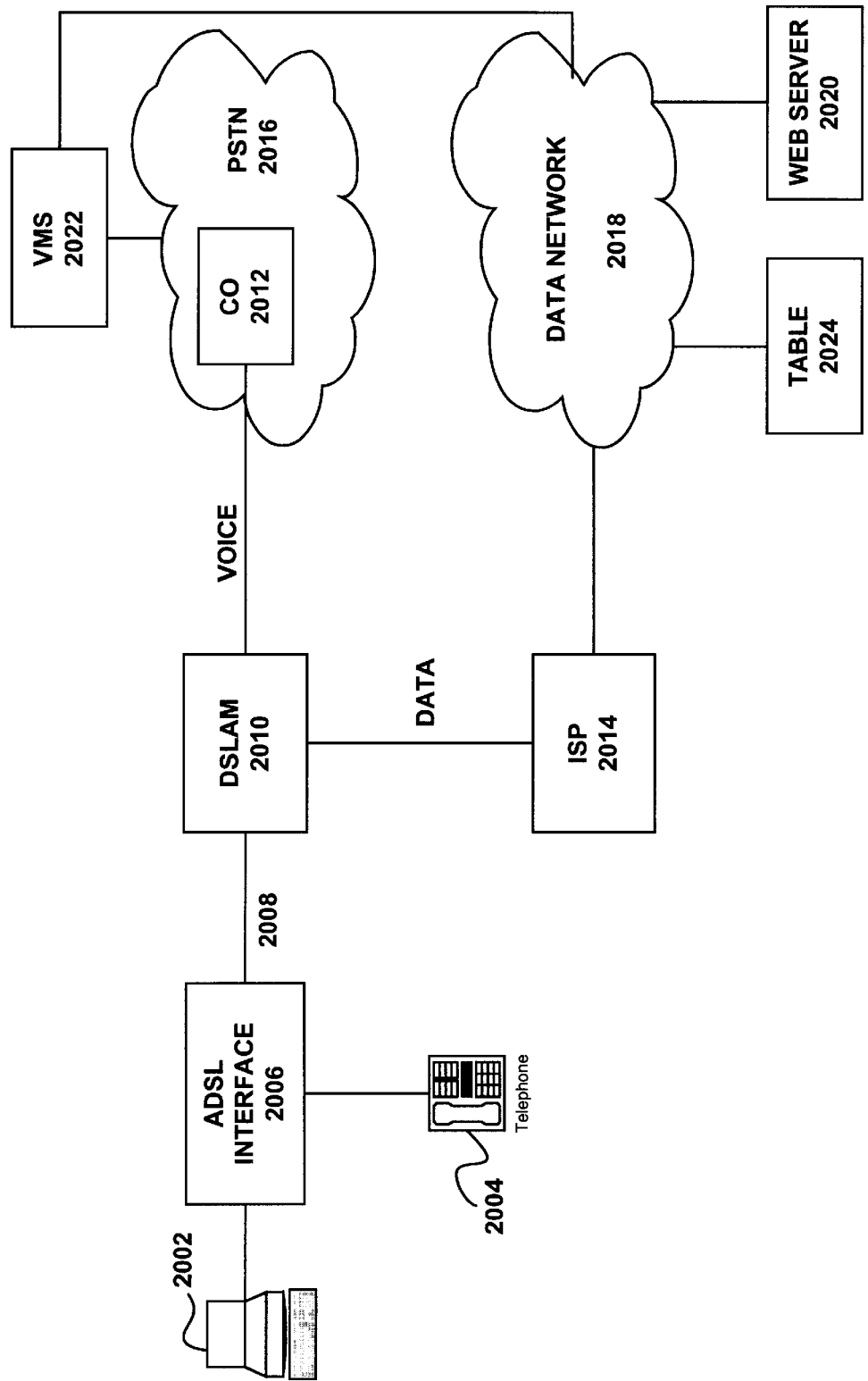

Referring to FIG. 20, another embodiment of the present invention is shown: computer terminal 2002 and telephone handset 2004 are connected to ADSL interface 2006. ADSL interface 2006 is connected by way of communications line 2008 to Digital Subscriber Line Access Multiplexer (DSLAM) 2010. DSLAM 2010 separates voice traffic which is sent to central office 2012, and data traffic which is sent to internet service provider 2014. Central Office 2012 is a part of a switched network 2016, such as the PSTN. ISP 2014 is connected to a data network 2018. Web server 2020 is connected to data network 2018 and VMS 2022 is connected to PSTN 2016. This system is typically found in a residential home.

Referring to FIG. 20, call control using a graphical user interface is accomplished in the following manner:

(I) A caller places a call from telephone handset 2004. The call is routed through ADSL interface 2006 and across communication line 2008 to DSLAM 2010 where it is directed into central office 2012.

(II) The call is diverted to VMS 2022.

(III) A look-up table 2024 is queried to match the caller ID to the ISP address of ISP 2014.

(IV) An http message is sent to terminal 2002 from VMS 2022 via data network 2018.

(V) The call then proceeds as described in steps 1550–1596, above, and shown in FIG. 15.

Throughout this description reference is made to call control at a VMS. This call control using a GUI over a data network could also be used to control calls at a central office, pbx, gatekeeper, any other telephone switch, or any other device with a TAPI or TSAPI interface.

It should be noted that throughout this detailed description the web server software could be located at a computer terminal or at a VMS.

It will be further understood that the invention is not limited to the embodiments described herein which are merely illustrative of a preferred embodiment of carrying out the invention, and which are susceptible to modification of form, arrangement of parts, steps, details, and order of operation. The invention, rather, is intended to encompass all such modification with its spirit and scope, as defined by the claims.

What is claimed is:

1. A method of handling a voice call diverted to a voice mail system (VMS), comprising:
   determining in a lookup table, in response to said voice call, a data network address of a network terminal associated with a calling telephone station apparatus for said voice call;
   sending a voice call facilitation message to said address over a data network; and,
   wherein said lookup table is associated with an apparatus selected from a group consisting of: a central office, a PBX, a VMS, a gatekeeper, a calling station apparatus and a LAN.

2. The method of claim 1 further comprising:
   receiving a call control command from said address over said data network; and
   controlling said voice call at said VMS in accordance with said call control command.

3. The method of claim 2 wherein the step of determining the data network address of said network terminal comprises:
   determining a caller ID of said caller;
   determining if said caller ID matches a value stored in said lookup table; and
   if said caller ID matches said stored value, then determining said data network address of said network terminal stored in said lookup table and corresponding to said matched caller ID.

4. The method of claim 3 wherein said table is associated with said VMS.

5. The method of claim 3 wherein said table is associated with said terminal of said caller.

6. The method of claim 2 wherein the step of sending said voice call facilitation message to said address over said data network further comprises:
   determining a called number of said call;
   determining if said called number of said call matches a value stored in said lookup table;
   if said called number matches said stored value, then determining from said lookup table a web server address corresponding to said called number; and
   sending a message to said web server address, said message containing said network address of said terminal, said called number and a caller ID of said caller.

7. The method of claim 6 further comprising:
   receiving said message at said web server; and
   determining if a call is in progress between said caller and said called number.

8. The method of claim 2 wherein said voice call facilitation message identifies said voice call at said VMS.

9. The method of claim 2 wherein said voice call facilitation message provides parameters for a display of a graphical call control page at said network terminal.

10. The method of claim 9 wherein said parameters provide an address for a graphical call control page on said data network.

11. The method of claim 10 further comprising:
    receiving a request from said address for said graphical call control page and returning said graphical call control page to said address.

12. The method of claim 2 wherein said call control command includes an address for a given graphical call control page on said data network, the method further comprising returning said given graphical call control page to said address.

13. A computer readable medium storing computer executable instructions comprising:
    means for determining in a lookup table, in response to a said voice call, a data network address of a network terminal associated with a calling telephone station apparatus for said voice call;
    means for sending a voice call facilitation message to said data network address over a data network; and
    wherein said lookup table is associated with an apparatus selected from a group consisting of: a central office, a PBX, a VMS, a gatekeeper, a calling station apparatus and a LAN.

14. A method of handling a voice call, comprising:
    determining in a lookup table, in response to said voice call, a data network address of a network terminal associated with a calling telephone station apparatus for said voice call, and wherein said lookup table is associated with an apparatus selected from a group consisting of: a central office, a PBX, a VMS, a gatekeeper, a calling station apparatus and a LAN;
    identifying a graphical page associated with said called telephone station apparatus for said voice call; and
    sending the graphical page to said address.

15. A method comprising:
    (a) initiating a voice call from a telephone handset to a called gatekeeper;
    (b) exchanging set up information with said called gatekeeper;
    (c) diverting said voice call to a voice-mail system associated with said called gatekeeper;
    (d) sending a caller IP address to a web site server associated with said called gatekeeper;
    (e) sending, over a data network, a call control URL to said caller IP address from said web site server;
    (f) receiving, over a data network, a call control command from said caller IP address at said web site server; and
    (g) transmitting a call control signal to said voice mail system in response to said call control command.

16. A method comprising:
    (a) receiving from a lookup table, via a data network, an IP address of a caller in response to a voice call initiated by said caller, and wherein said lookup table is associated with an apparatus selected from a group consisting of: a central office, a PBX, a VMS, a gatekeeper, a calling station apparatus, and a LAN;

(b) sending, via a data network, a call control URL to said IP address;
(c) receiving, via a data network, a call control command from said IP address; and
(d) transmitting a call control signal to a voice mail system in response to said call control command.

17. An apparatus comprising:
(a) means for receiving from a lookup table, via a data network, an IP address of a caller in response to a voice call initiated by said caller, and wherein said lookup table is associated with an apparatus selected from a group consisting of: a central office, a PBX, a VMS, a gatekeeper, a calling station apparatus and a LAN;
(b) means for sending, via a data network, a call control URL to said IP address;
(c) means for receiving, via a data network, a call control command from said IP address; and
(d) means for transmitting a call control signal to a voice mail system in response to said call control command.

18. An apparatus comprising:
(a) a network interface;
(b) a processor connected to said network interface;
(c) a voice-mail interface connected to said processor;
(d) a memory associated with said processor;
(e) an internet software application stored in said memory, said internet software application, via said network interface commands and in response to a voice call initiated from a caller telephone handset, receiving IP addresses, transmitting call control URL's, and receiving call control commands via a data network to said caller; and
(f) a voice-mail system software application stored in said memory, said voice-mail system software application, via said voice-mail interface, transmitting signals to said voice-mail interface in response to call control commands.

19. A method for operating a voice mail system comprising:
(a) accepting a voice call placed from a telephone handset at said voice mail system;
(b) passing call control options via a data network to an associated data network element, said call control options having graphical components further operable for display on a terminal associated with said telephone handset;
(c) receiving call control signals for said voice call from said associated data network element via the data network; and
(d) controlling said voice call in response to said call control signals.

20. The method of claim 19 wherein said call is accepted from a switched network and said call control signals are received from a data network to which said associated data network element is connected.

21. The method of claim 19 wherein said associated data network element is a server.

22. The method of claim 19 wherein said associated data network element is a component terminal.

* * * * *